(12) United States Patent
Lin

(10) Patent No.: US 9,413,937 B2
(45) Date of Patent: Aug. 9, 2016

(54) IMAGING LENS ASSEMBLY AND MOBILE DEVICE

(71) Applicant: LARGAN PRECISION CO., LTD., Taichung (TW)

(72) Inventor: Cheng-Feng Lin, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 27 days.

(21) Appl. No.: 14/179,566

(22) Filed: Feb. 13, 2014

(65) Prior Publication Data

US 2015/0146093 A1    May 28, 2015

(30) Foreign Application Priority Data

Nov. 22, 2013   (TW) .............................. 102142655 A

(51) Int. Cl.
| | | |
|---|---|---|
| *G02B 7/02* | (2006.01) | |
| *H04N 5/225* | (2006.01) | |
| *G02B 5/00* | (2006.01) | |
| *G02B 27/00* | (2006.01) | |
| *G03B 17/02* | (2006.01) | |
| *G03B 17/12* | (2006.01) | |

(52) U.S. Cl.
CPC .............. *H04N 5/2254* (2013.01); *G02B 5/005* (2013.01); *G02B 7/02* (2013.01); *G02B 27/0018* (2013.01); *G03B 17/02* (2013.01); *G03B 17/12* (2013.01)

(58) Field of Classification Search
CPC .......... G02B 5/00; G02B 5/0005; G02B 7/02; G02B 23/16; G03B 9/02; G03B 17/02; G03B 11/041
USPC .................................. 359/601–614, 819–830
See application file for complete search history.

(56) References Cited

U.S. PATENT DOCUMENTS

| | | | |
|---|---|---|---|
| 2004/0207745 A1 | 10/2004 | Tsuruta et al. | |
| 2009/0147381 A1* | 6/2009 | Chen ............................. | 359/819 |
| 2010/0165468 A1* | 7/2010 | Yamada et al. ............... | 359/613 |

FOREIGN PATENT DOCUMENTS

TW            200925693 A       6/2009

* cited by examiner

*Primary Examiner* — Scott J Sugarman
*Assistant Examiner* — Gary O'Neill
(74) *Attorney, Agent, or Firm* — CKC & Partners Co., Ltd.

(57) ABSTRACT

An imaging lens assembly includes a barrel and a lens assembly, wherein the lens assembly is disposed in the barrel. The barrel has an incident light surface and a barrel cylindrical axis, wherein the incident light surface includes a specular region including at least one specular protrusion region disposed thereon. An angle between a shortest line from an innermost edge to an outermost edge of the specular protrusion region and a normal line to the barrel cylindrical axis is θ.

26 Claims, 30 Drawing Sheets

1400

IMAGING LENS ASSEMBLY AND MOBILE DEVICE

RELATED APPLICATIONS

This application claims priority to Taiwan Application Serial Number 102142655, filed Nov. 22, 2013, which is herein incorporated by reference.

BACKGROUND

1. Technical Field

The present invention relates to an imaging lens assembly. More particularly, the present invention relates to an imaging lens assembly for avoiding the unexpected incident light passing through a lens assembly thereof.

2. Description of Related Art

In recent years, with the popularity of personal electronic devices and mobile terminals having camera functionalities, such as mobile phones or Tablet PC, the demand of compact optical lens assemblies has been increasing. Currently, compact optical lens assemblies have gradually evolved toward the field of higher megapixels for satisfying the needs of compact size and high image quality. However, compact optical lens assemblies are limited to small space thereof, but with the requirements of a larger aperture and a larger field of view; thus, unexpected incident light would be reflected and pass through compact optical lens assemblies. Therefore, image defects would be produced, such as flare, glare, ghost, etc.

FIG. 1 shows a schematic view of a conventional imaging lens 1500. In FIG. 1, with the arrangement of the incident light surface 1511 of the barrel 1510 of the conventional imaging lens 1500, the unexpected incident light easily pass through the lens assembly 1520 by the reflection from the incident light surface 1511 (or the multi-reflection between the incident light surface 1511 of the barrel 1510 and the cover glass 1530 on the front side). The image defects would be produced by excessive unexpected incident light thereby influencing image quality.

SUMMARY

According to one aspect of the present disclosure, an imaging lens assembly includes a barrel and a lens assembly, wherein the lens assembly is disposed in the barrel. The barrel has an incident light surface and a barrel cylindrical axis, wherein the incident light surface includes a specular region including at least one specular protrusion region disposed thereon. An angle between a shortest line from an innermost edge to an outermost edge of the specular protrusion region and a normal line to the barrel cylindrical axis is θ, and the following condition is satisfied:

10 degrees<θ<45 degrees.

According to another aspect of the present disclosure, a mobile device includes an imaging lens assembly including a barrel and a lens assembly disposed in the barrel. The barrel has an incident light surface and a barrel cylindrical axis, wherein the incident light surface includes a specular region including at least one specular protrusion region disposed thereon. An angle between a shortest line from an innermost edge to an outermost edge of the specular protrusion region and a normal line to the barrel cylindrical axis is θ, and the following condition is satisfied:

10 degrees<θ<45 degrees.

According to yet another aspect of the present disclosure, an imaging lens assembly includes a barrel, a lens assembly and a cover glass, wherein the lens assembly is disposed in the barrel, and the cover glass is located on an incident light side of the barrel. The barrel has an incident light surface and a barrel cylindrical axis, wherein the incident light surface includes a specular region. A surface roughness of the specular region is SR, and a minimum distance on the barrel cylindrical axis between the cover glass and the lens assembly is D1, the following conditions are satisfied:

SR<1.0 μm; and 0 mm<$D1$<2.0 mm.

According to yet another aspect of the present disclosure, a mobile device includes an imaging lens assembly including a barrel, a lens assembly and a cover glass, wherein the lens assembly is disposed in the barrel, and a cover glass is located on an incident light side of the barrel. The barrel has an incident light surface and a barrel cylindrical axis, wherein the incident light surface includes a specular region. A surface roughness of the specular region is SR, and a minimum distance on the barrel cylindrical axis between the cover glass and the lens assembly is D1, the following conditions are satisfied:

SR<1.0 μm; and 0 mm<$D1$<2.0 mm.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
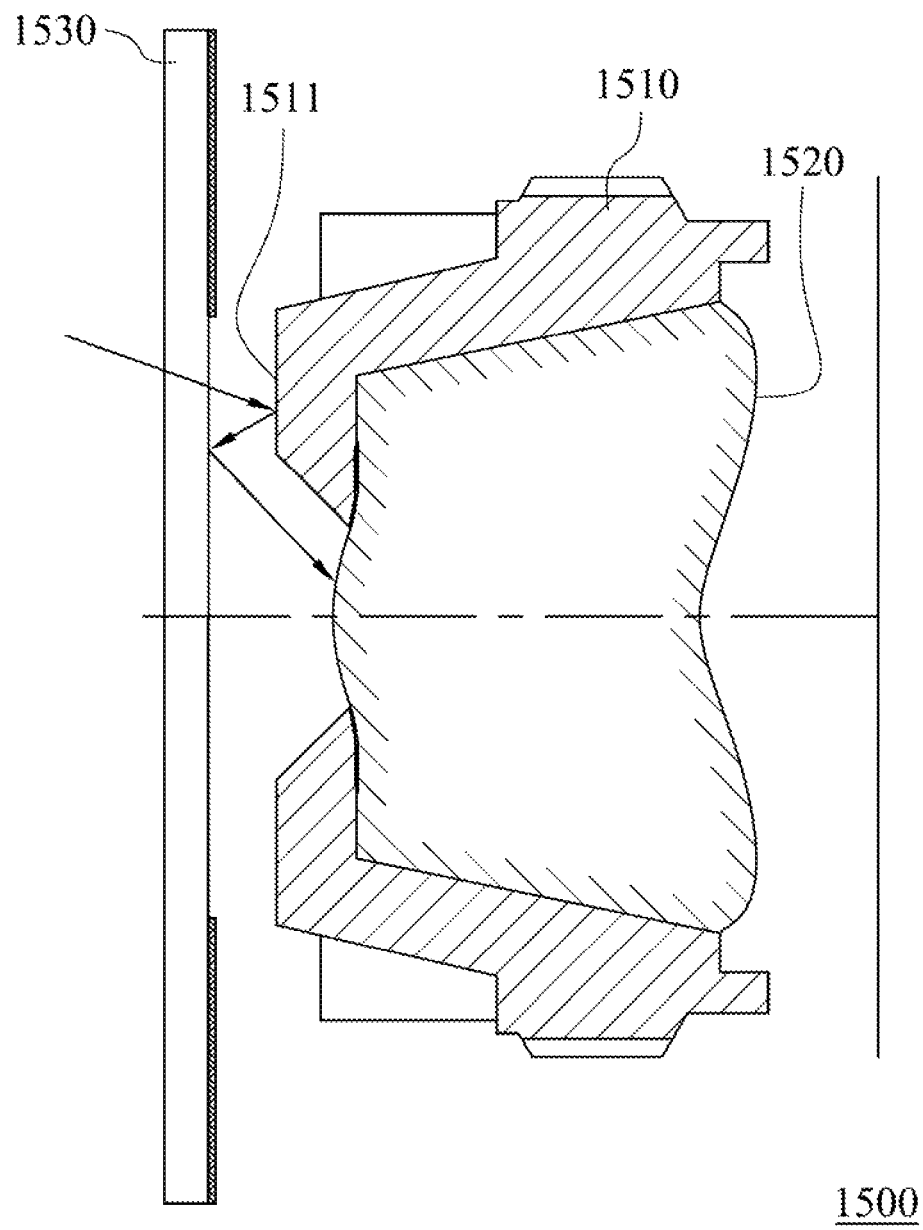
FIG. 1 shows a schematic view of a conventional imaging lens.
Figure 2A:
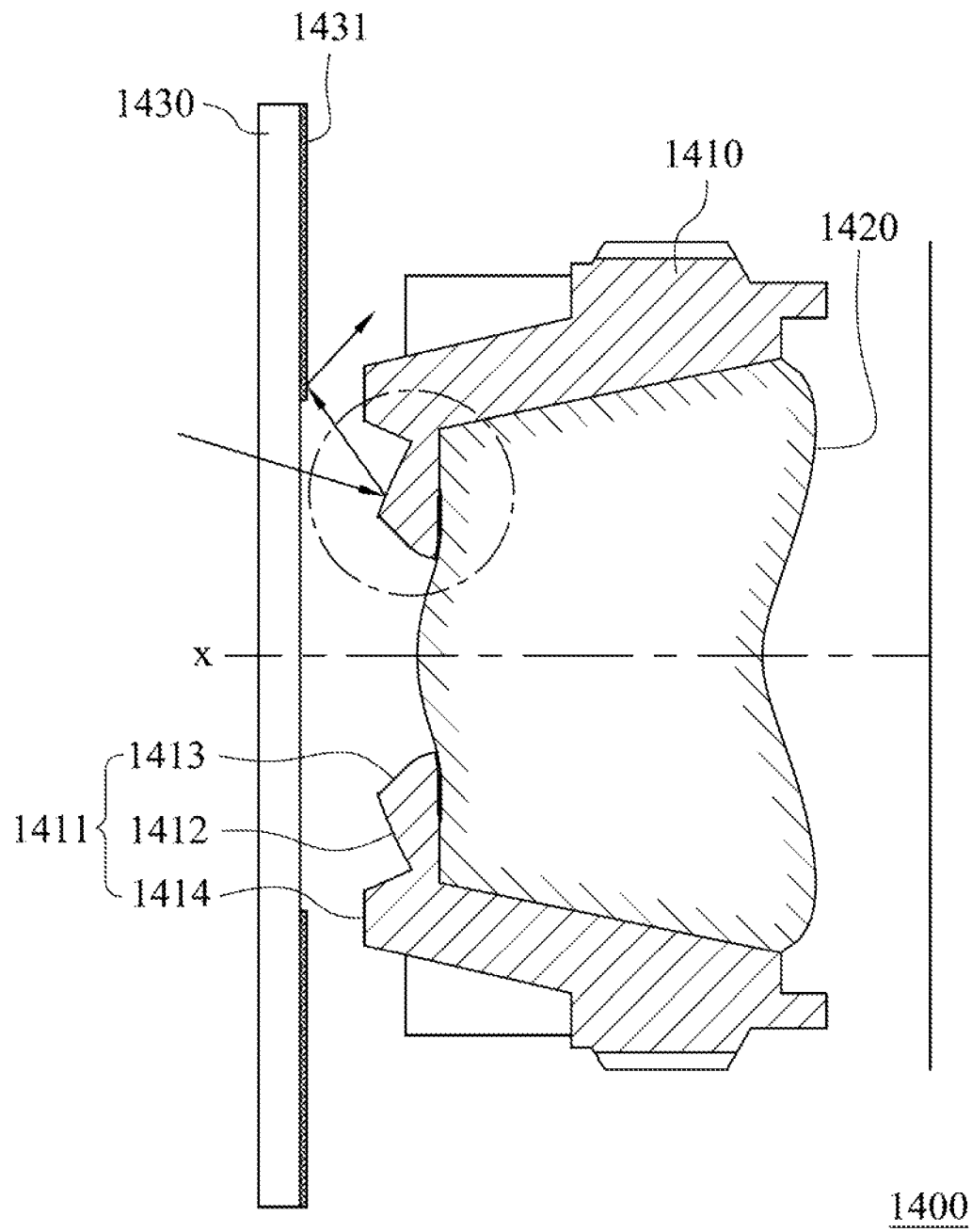
FIG. 2A shows a schematic view of an imaging lens assembly according to one embodiment of the present disclosure.

FIG. 2A shows a schematic view of an imaging lens assembly 1400 according to one embodiment of the present disclosure. In FIG. 2A, the imaging lens assembly 1400 includes a barrel 1410 and a lens assembly 1420, wherein the lens assembly 1420 is disposed in the barrel 1410. The barrel 1410 has an incident light surface 1411 and a barrel cylindrical axis X, and the incident light surface 1411 includes a specular region 1412. The specular region 1412 can adjust the reflective direction of unexpected incident light, so that the unexpected incident light can be redirected away from the imaging lens assembly 1400. Therefore, the imaging quality can be improved.

Figure 2B:
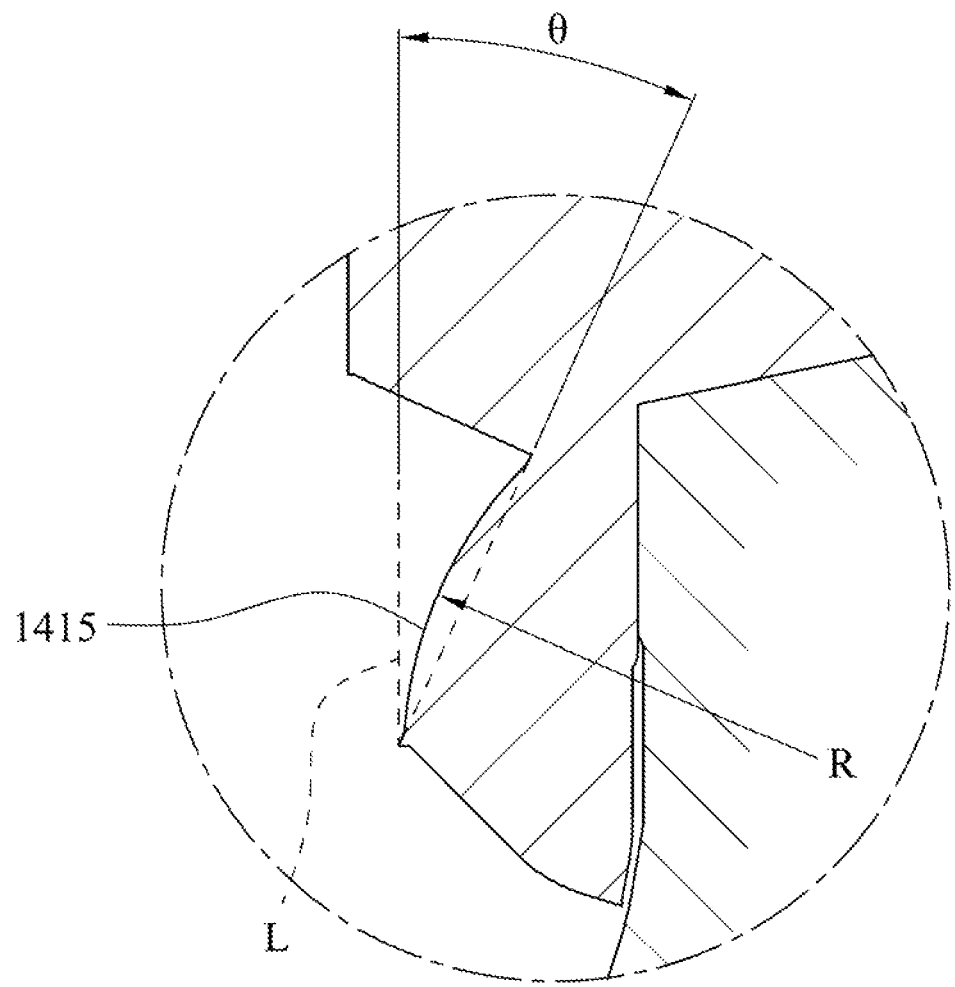
FIG. 2B shows an enlarged view of a specular region of the incident light surface of the barrel of FIG. 2A.

FIG. 2B shows an enlarged view of a specular region 1412 of the incident light surface 1411 of the barrel 1410 of FIG. 2A. The specular region 1412 of the incident light surface 1411 includes at least one specular protrusion region 1415 disposed thereon. The specular protrusion region 1415 can further redirect the unexpected incident light away from the imaging lens assembly 1400 for improving the image quality.

In FIG. 2B, the parameter R and θ are labeled. The specular protrusion region 1415 has a curved surface; the curvature radius of the curved surface is R. An angle between a shortest line from an innermost edge to an outermost edge of the specular protrusion region 1415 and a normal line to the barrel cylindrical axis X is θ.

Furthermore, the specular region 1412 includes at least one specular protrusion region 1415 disposed thereon, and the specular protrusion region 1415 can have a curved surface, wherein the curvature radius of the curved surface is R, and the following condition can be satisfied: 0 mm<R<20 mm. Therefore, the reflective angle of the unexpected incident light can be altered and is redirected away from the lens assembly 1420. Preferably, the following condition can be satisfied: 0 mm<R<10 mm.

The angle between the shortest line from the innermost edge to the outermost edge of the specular protrusion region 1415 and the normal line to the barrel cylindrical axis X is θ, and the following condition is satisfied: 10 degrees<θ<45 degrees. Therefore, the reflective angle of the unexpected incident light can be adjusted and farther from the lens assembly 1420. Preferably, the following condition is satisfied: 15 degrees<θ<30 degrees.

A surface roughness of the specular region 1412 is SR (which is defined by the average roughness), and the following condition is satisfied: SR<1.0 μm. Therefore, the efficiency of the reflection of the unexpected incident light can be enhanced and the scattering of the unexpected incident light can be reduced by the specular region 1412. Preferably, the following condition is satisfied: SR<0.35 μm. More preferably, the following condition is satisfied: SR<0.15 μm.

The specular region 1412 can include at least two specular protrusion regions 1415. Therefore, the reflection region of the unexpected incident light can be better allocated with favorable angles of specular protrusion regions of the specular region. It is favorable for manufacturing.

The incident light surface 1411 of the barrel 1410 can include an inner circular region 1413. The inner circular region 1413 is connected to the specular region 1412 and is closer to the barrel cylindrical axis X than the specular region 1412, wherein the inner circular region 1413 includes a light diminishing structure, such as microstructure, light absorption layer, etc. Therefore, the unexpected incident light can be weakened or removed by the light diminishing structure for improving the image quality.

The incident light surface 1411 of the barrel 1410 can further include an outer circular region 1414. The outer circular region 1414 is connected to the specular region 1412 and is farther from the barrel cylindrical axis X than the specular region 1412, wherein the outer circular region 1414 also includes a light diminishing structure. The light diminishing structure can control the unexpected incident light with a large incident angle, so that the effect of the unexpected incident light on the image quality can be compensated.

The imaging lens assembly 1400 can further include a cover glass 1430 located on an incident light side of the barrel 1410. A light-limiting element 1431 can be arranged on the cover glass 1430 for controlling the unexpected incident light, and the multi-reflections of the unexpected incident light between the incident light surface 1411 and the light-limiting element 1431 can be avoided, so that the unexpected incident light traveling into the lens assembly 1420 can be limited.

Figure 2C:
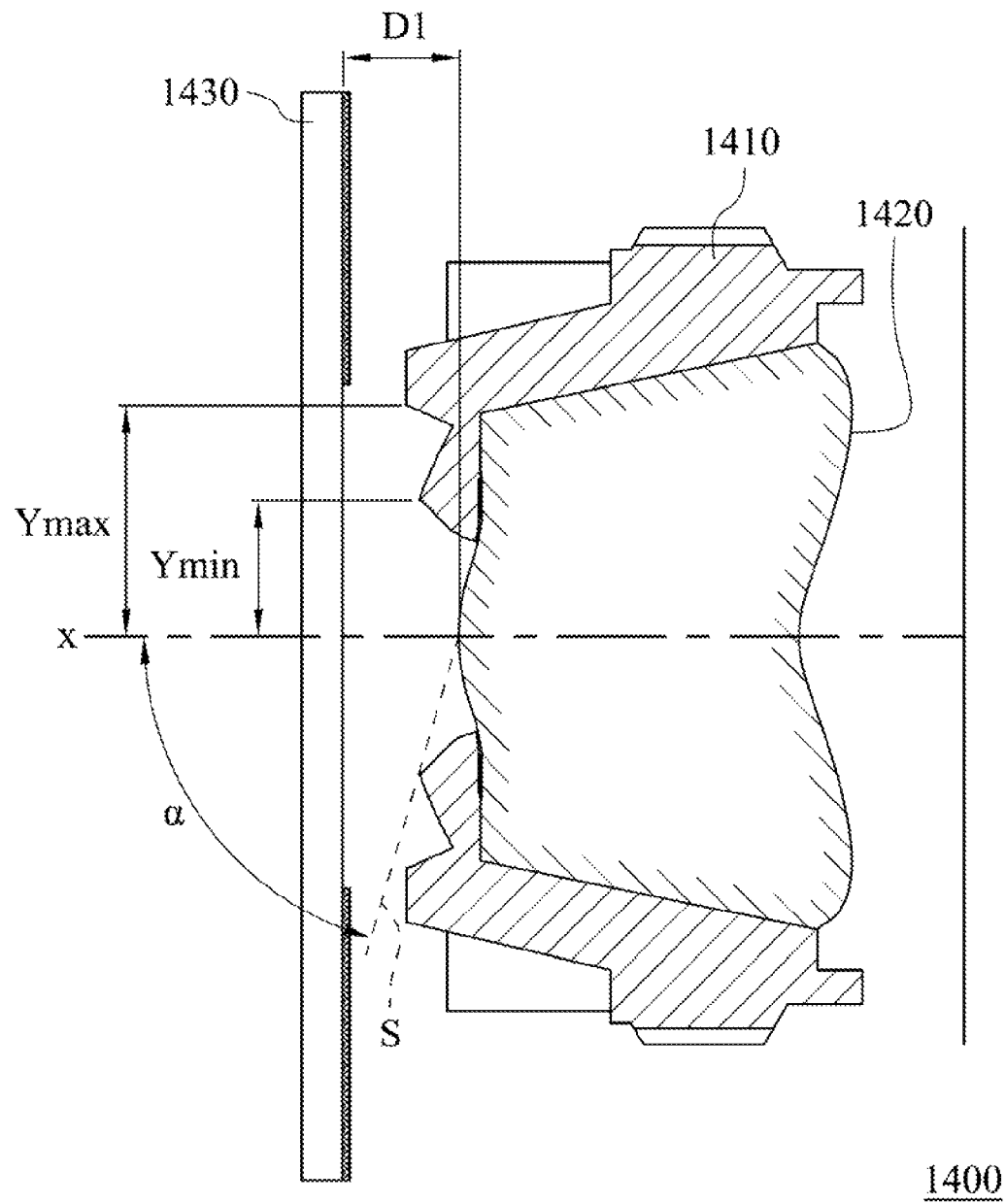
FIG. 2C shows a schematic view of parameters of the imaging lens assembly in FIG. 2A.

FIG. 2C shows a schematic view of parameters of the imaging lens assembly 1400 in FIG. 2A. In FIG. 2C, the cover glass is located on an incident light side of the barrel 1410, wherein a minimum distance on the barrel cylindrical axis between the cover glass 1430 and the lens assembly 1420 is D1, the following condition is satisfied: 0 mm<D1<2.0 mm. It is favorable for controlling the incident angle of the unexpected incident light from being too large, so that the image quality can be maintained. Preferably, the following condition is satisfied: 0 mm<D1<1.3 mm. More preferably, the following condition is satisfied: 0 mm<D1<1.0 mm.

A maximum vertical distance from the specular region 1412 to the barrel cylindrical axis X is Ymax, and a minimum vertical distance from the specular region 1412 to the barrel cylindrical axis X is Ymin, the following condition is satisfied: 0.2<(Ymax−Ymin)/Ymax<0.8. Therefore, the specular region 1412 for reflecting the unexpected incident light can be widened, so that the unexpected incident light for all angles can be reflected far away from the lens assembly effectively. Preferably, the following condition is satisfied: $0.4<(Ymax-Ymin)/Ymax<0.7$.

An angle between a shortest line from an innermost edge of the specular region to an axial vertex nearest an incident light side of the lens assembly and the barrel cylindrical axis is α, the following condition is satisfied: 60 degrees<α<90 degrees. Therefore, the reflection of the unexpected incident light can be redirected farther away from the lens assembly. Preferably, the following condition is satisfied: 70 degrees<α<85 degrees.

According to the present disclosure, a mobile device is provided, wherein the mobile device includes the foregoing imaging lens assembly. The mobile device can be a mobile phone, a Tablet PC, or a wearable device. The imaging lens assembly of the mobile device includes a specular region for redirecting reflections from the unexpected incident light. Therefore, the unexpected incident light can be reflected far away from the lens assembly for increasing image quality.

According to the above description of the present disclosure, the following 1st-13th specific examples are provided for further explanation.

1st Example

Figure 3A:
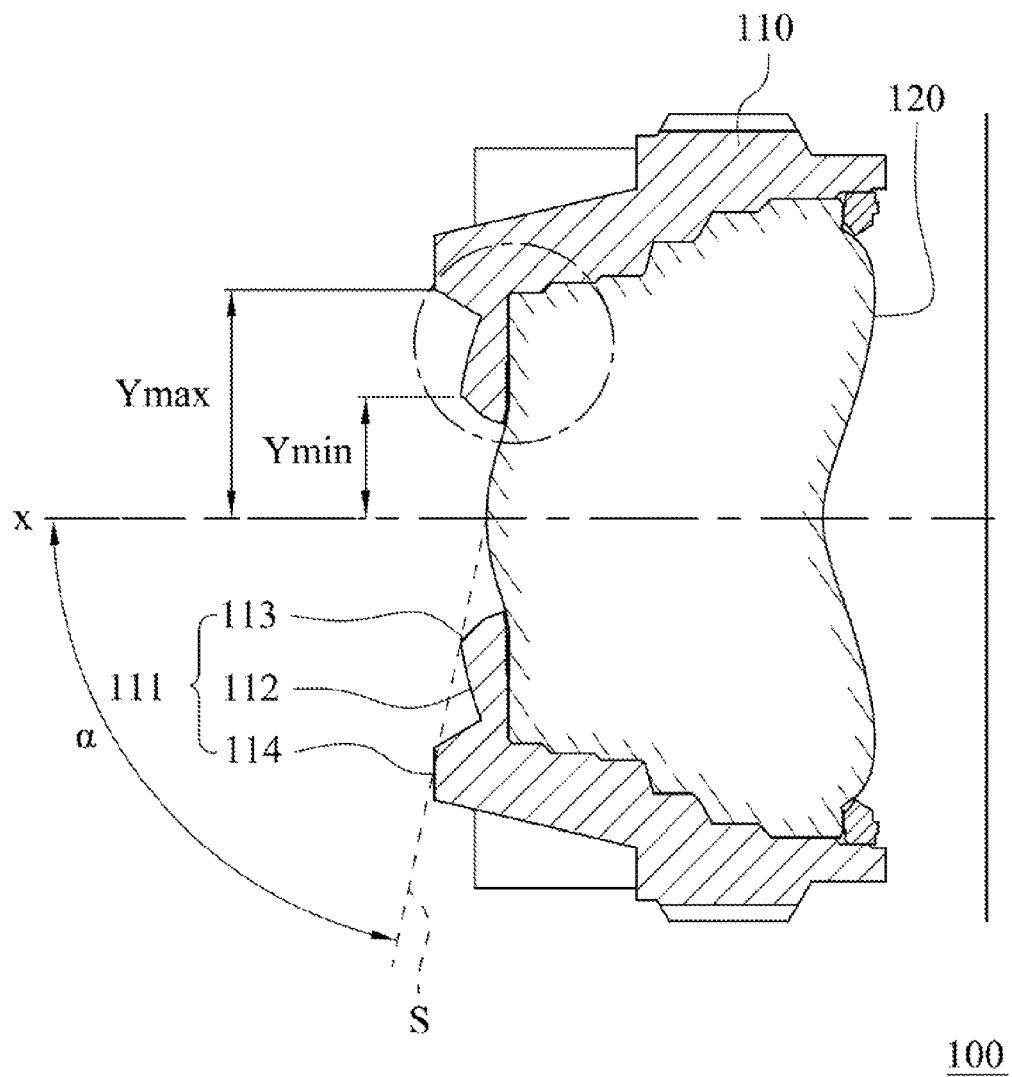
FIG. 3A shows a schematic view of an imaging lens assembly according to 1st example of the present disclosure.
Figure 3B:
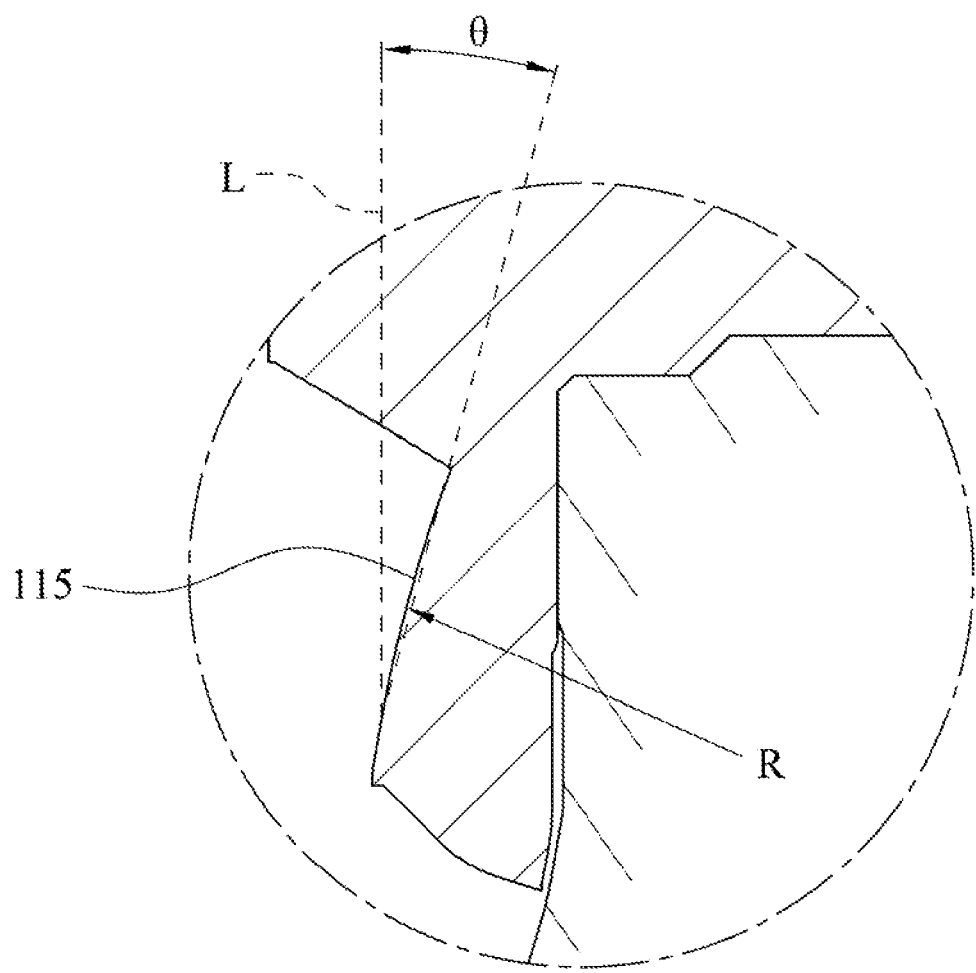
FIG. 3B shows an enlarged view of a specular region of the imaging lens assembly of FIG. 3A.

FIG. 3A shows a schematic view of an imaging lens assembly 100 according to 1st example of the present disclosure. FIG. 3B shows an enlarged view of a specular region 112 of the imaging lens assembly 100 of FIG. 3A. In FIGS. 3A and 3B, the imaging lens assembly 100 includes a barrel 110 and a lens assembly 120, wherein the lens assembly 120 is disposed in the barrel 110. The barrel 110 has an incident light surface 111 and a barrel cylindrical axis X, wherein the incident light surface 111 includes a specular region 112, an inner circular region 113 and an outer circular region 114. The inner circular region 113 is connected to the specular region 112 and is closer to the barrel cylindrical axis X than the specular region 112. The outer circular region 114 is connected to the specular region 112 and is farther from the barrel cylindrical axis X than the specular region 112. The specular region 112 includes a specular protrusion region 115 disposed thereon, and the specular protrusion region 115 has a curved surface. The inner circular region 113 includes a light diminishing structure formed by a surface roughening process in 1st example.

According to 1st example of the present disclosure, the parameters are defined as follows. A surface roughness of the specular region 112 is SR. A maximum vertical distance from the specular region 112 to the barrel cylindrical axis X is Ymax. A minimum vertical distance from the specular region 112 to the barrel cylindrical axis X is Ymin. A curvature radius of the curved surface of the specular protrusion region 115 is R. An angle between a shortest line from an innermost edge to an outermost edge of the specular protrusion region 115 and a normal line to the barrel cylindrical axis X is θ. An angle between a shortest line from an innermost edge of the specular region 112 to an axial vertex nearest an incident light side of the lens assembly 120 and the barrel cylindrical axis X is α.

According to 1st example of the present disclosure, the values of SR, Ymax, Ymax−Ymin, (Ymax−Ymin)/Ymax, R, θ and α are shown in Table 1 as follows.

TABLE 1

| 1st Example | | | | | | | |
|---|---|---|---|---|---|---|---|
| SR (μm) | Ymax (mm) | Ymax − Ymin (mm) | (Ymax − Ymin)/ Ymax | R (mm) | θ (deg.) | α (deg.) | D1 (mm) |
| 0.08 | 1.70 | 0.80 | 0.47 | 2.5 | 14.04 | 78.08 | — |

2nd Example

Figure 4A:
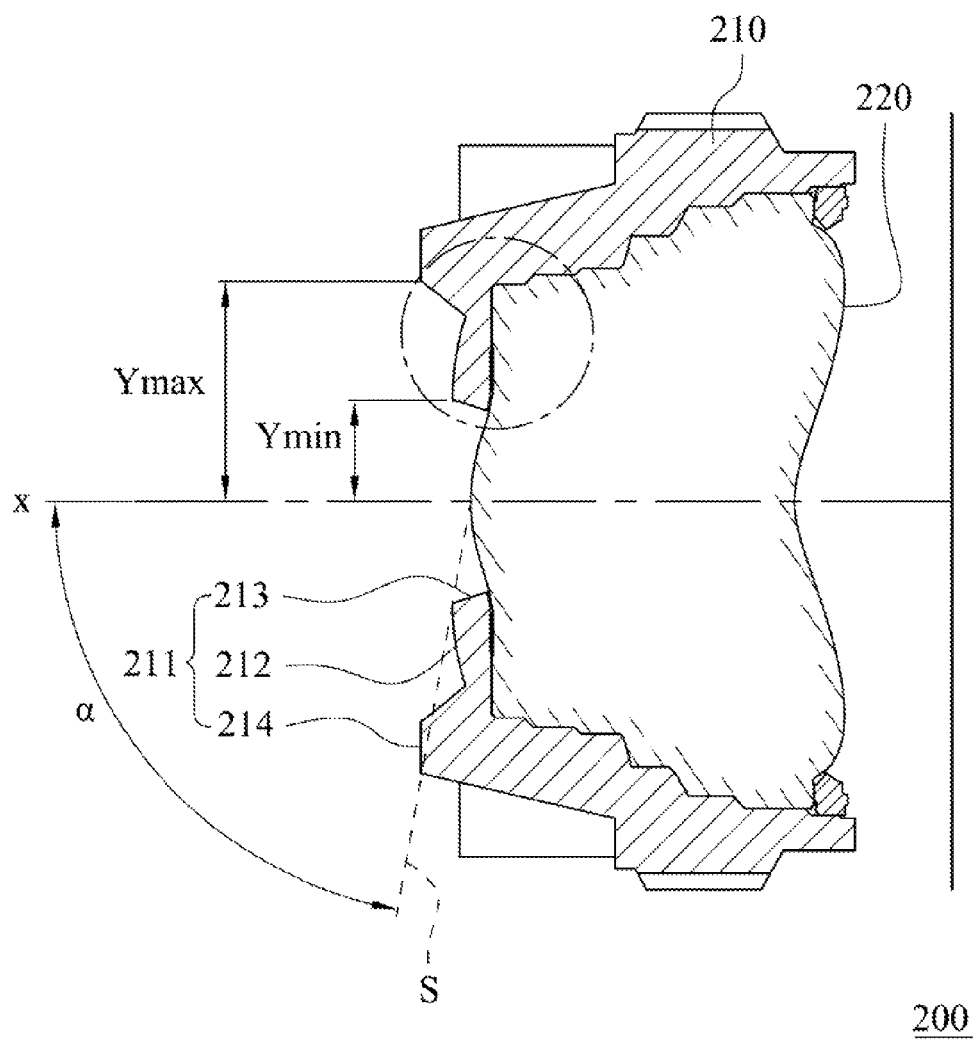
FIG. 4A shows a schematic view of an imaging lens assembly according to 2nd example of the present disclosure.
Figure 4B:
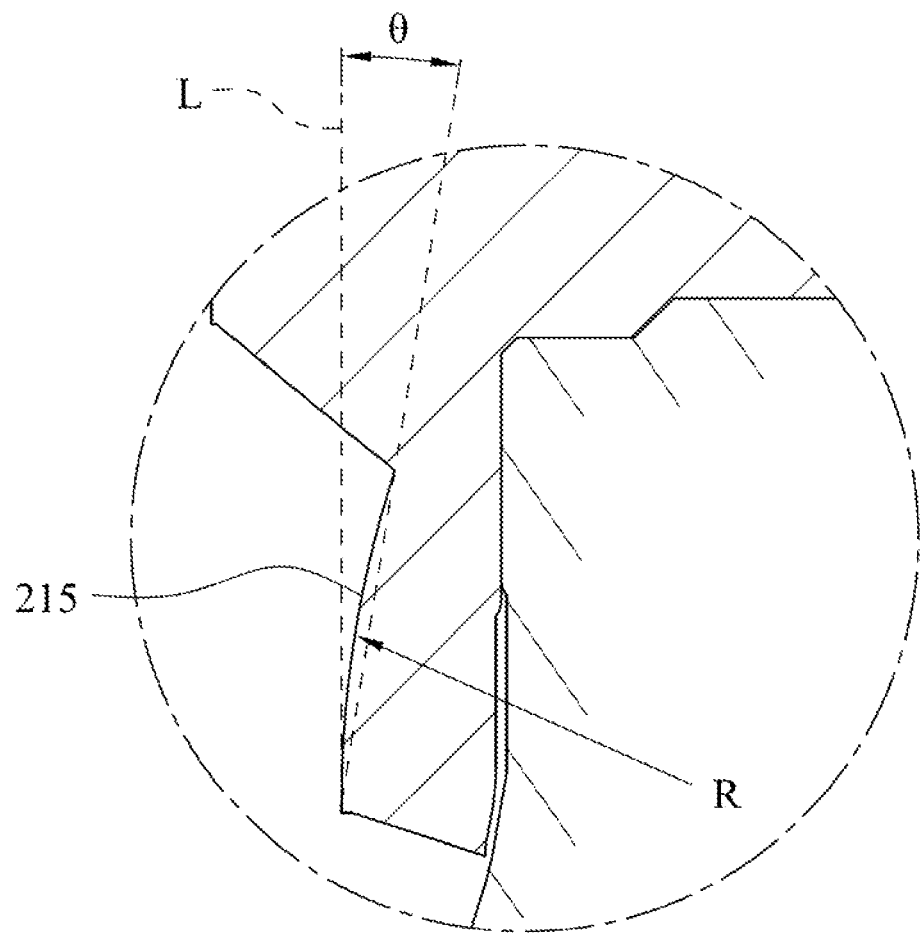
FIG. 4B shows an enlarged view of a specular region of the imaging lens assembly of FIG. 4A.

FIG. 4A shows a schematic view of an imaging lens assembly 200 according to 2nd example of the present disclosure. FIG. 4B shows an enlarged view of a specular region 212 of the imaging lens assembly 200 of FIG. 4A. In FIGS. 4A and 4B, the imaging lens assembly 200 includes a barrel 210 and a lens assembly 220, wherein the lens assembly 220 is disposed in the barrel 210. The barrel 210 has an incident light surface 211 and a barrel cylindrical axis X, wherein the incident light surface 211 includes a specular region 212, an inner circular region 213 and an outer circular region 214. The inner circular region 213 is connected to the specular region 212 and is closer to the barrel cylindrical axis X than the specular region 212. The outer circular region 214 is connected to the specular region 212 and is farther from the barrel cylindrical axis X than the specular region 212. The specular region 212 includes a specular protrusion region 215 disposed thereon, and the specular protrusion region 215 has a curved surface. The inner circular region 213 includes a light diminishing structure formed by a surface roughening process in 2nd example.

In the imaging lens assembly according to the 2nd example, the definitions of the following parameters are the same as those stated in the 1st example with corresponding values for the 2nd example. The values of SR, Ymax, Ymax−Ymin, (Ymax−Ymin)/Ymax, R, θ and α are shown in Table 2 as follows.

TABLE 2

| 2nd Example | | | | | | | |
|---|---|---|---|---|---|---|---|
| SR (μm) | Ymax (mm) | Ymax − Ymin (mm) | (Ymax − Ymin)/ Ymax | R (mm) | θ (deg.) | α (deg.) | D1 (mm) |
| 0.03 | 1.70 | 0.92 | 0.54 | 2.0 | 8.83 | 79.82 | — |

3rd Example

Figure 5A:
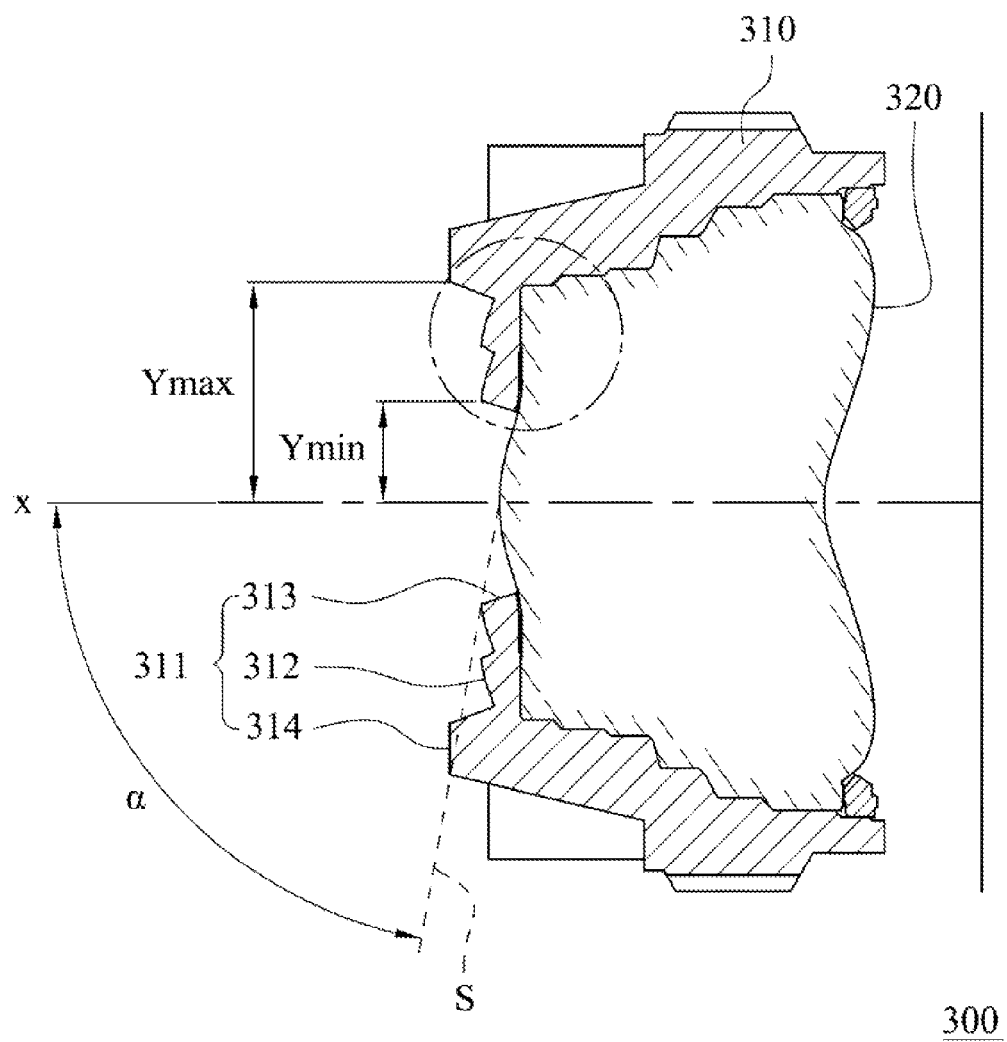
FIG. 5A shows a schematic view of an imaging lens assembly according to 3rd example of the present disclosure.
Figure 5B:
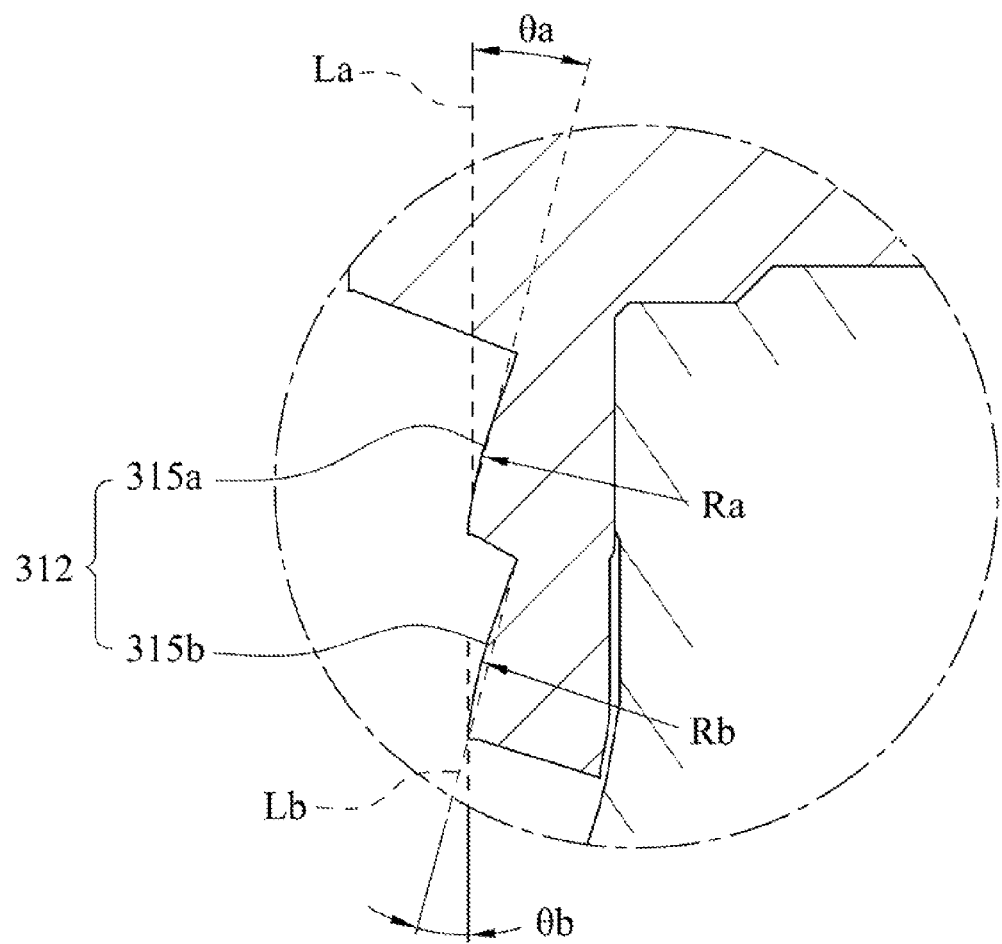
FIG. 5B shows an enlarged view of a specular region of the imaging lens assembly of FIG. 5A.

FIG. 5A shows a schematic view of an imaging lens assembly 300 according to 3rd example of the present disclosure. FIG. 5B shows an enlarged view of a specular region 312 of the imaging lens assembly 300 of FIG. 5A. In FIGS. 5A and 5B, the imaging lens assembly 300 includes a barrel 310 and a lens assembly 320, wherein the lens assembly 320 is disposed in the barrel 310. The barrel 310 has an incident light surface 311 and a barrel cylindrical axis X, wherein the incident light surface 311 includes a specular region 312, an inner circular region 313 and an outer circular region 314. The inner circular region 313 is connected to the specular region 312 and is closer to the barrel cylindrical axis X than the specular region 312. The outer circular region 314 is connected to the specular region 312 and is farther from the barrel cylindrical axis X than the specular region 312. The specular region 312 includes two specular protrusion regions 315a, 315b disposed thereon, and each of the specular protrusion regions 315a, 315b has a curved surface. The inner circular region 313 includes a light diminishing structure formed by a surface roughening process in 3rd example.

According to 3rd example of the present disclosure, the parameters are defined as follows. A surface roughness of the specular region 312 is SR. A maximum vertical distance from the specular region 312 to the barrel cylindrical axis X is Ymax. A minimum vertical distance from the specular region 312 to the barrel cylindrical axis X is Ymin. The curvature radii of two specular protrusion regions 315a, 315b are Ra, Rb, respectively. An angle between a shortest line from an innermost edge to an outermost edge of the specular protrusion region 315a and a normal line to the barrel cylindrical axis X is θa. An angle between a shortest line from an innermost edge to an outermost edge of the specular protrusion region 315b and a normal line to the barrel cylindrical axis X is θb. An angle between a shortest line from an innermost edge of the specular region 312 to an axial vertex nearest an incident light side of the lens assembly 320 and the barrel cylindrical axis X is α.

According to 3rd example of the present disclosure, the values of SR, Ymax, Ymax−Ymin, (Ymax−Ymin)/Ymax, Ra、Rb、θa、θb and α are shown in Table 3 as follows.

TABLE 3

3rd Example

| SR (μm) | Ymax (mm) | Ymax − Ymin (mm) | (Ymax − Ymin)/ Ymax | R (mm) | θ (deg.) | α (deg.) | D1 (mm) |
|---|---|---|---|---|---|---|---|
| 0.05 | 1.70 | 0.92 | 0.54 | Ra 1.0 Rb 1.0 | θa 15.12 θb 15.12 | 79.82 | — |

4th Example

Figure 6A:
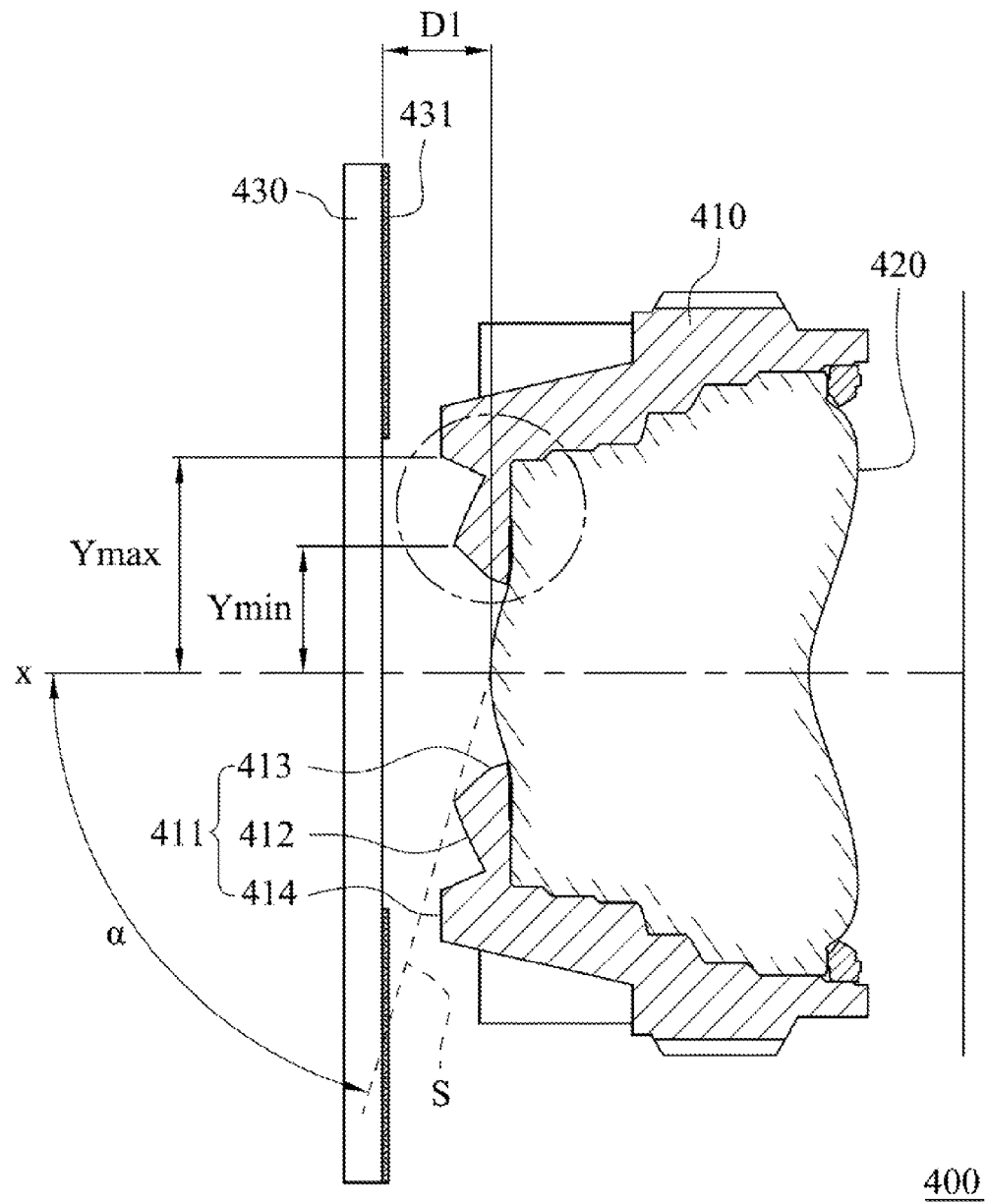
FIG. 6A shows a schematic view of an imaging lens assembly according to 4th example of the present disclosure.
Figure 6B:
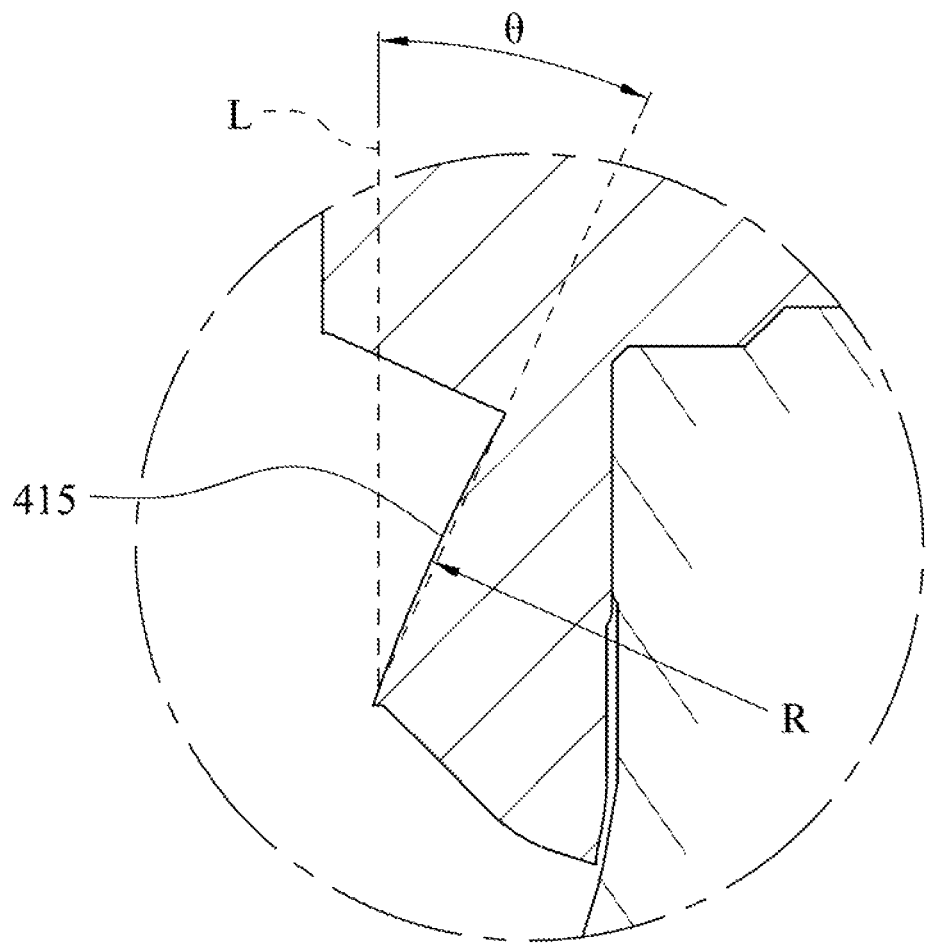
FIG. 6B shows an enlarged view of a specular region of the imaging lens assembly of FIG. 6A.

FIG. 6A shows a schematic view of an imaging lens assembly 400 according to 4th example of the present disclosure. FIG. 6B shows an enlarged view of a specular region 412 of the imaging lens assembly 400 of FIG. 6A. In FIGS. 6A and 6B, the imaging lens assembly 400 includes a barrel 410, a lens assembly 420 and a cover glass 430, wherein the lens assembly 420 is disposed in the barrel 410, and the cover glass 430 is located on an incident light side of the barrel 410. The barrel 410 has an incident light surface 411 and a barrel cylindrical axis X, wherein the incident light surface 411 includes a specular region 412, an inner circular region 413 and an outer circular region 414. The inner circular region 413 is connected to the specular region 412 and is closer to the barrel cylindrical axis X than the specular region 412. The outer circular region 414 is connected to the specular region 412 and is farther from the barrel cylindrical axis X than the specular region 412. The specular region 412 includes a specular protrusion region 415 disposed thereon, and the specular protrusion region 415 has a curved surface. The inner circular region 413 includes a light diminishing structure formed by a surface roughening process in 4th example. A light-limiting element 431 is arranged on the cover glass 430.

According to 4th example of the present disclosure, the parameters are defined as follows. A surface roughness of the specular region 412 is SR. A maximum vertical distance from the specular region 412 to the barrel cylindrical axis X is Ymax. A minimum vertical distance from the specular region 412 to the barrel cylindrical axis X is Ymin. A curvature radius of the curved surface of the specular protrusion region 415 is R. An angle between a shortest line from an innermost edge to an outermost edge of the specular protrusion region 415 and a normal line to the barrel cylindrical axis is θ. A minimum distance on the barrel cylindrical axis X between the cover glass 430 and the lens assembly 420 is D1. An angle between a shortest line from an innermost edge of the specular region 412 to an axial vertex nearest an incident light side of the lens assembly 420 and the barrel cylindrical axis X is α.

According to 4th example of the present disclosure, the values of SR, Ymax, Ymax−Ymin, (Ymax−Ymin)/Ymax, R, θ, α and D1 are shown in Table 4 as follows.

TABLE 4

4th Example

| SR (μm) | Ymax (mm) | Ymax − Ymin (mm) | (Ymax − Ymin)/ Ymax | R (mm) | θ (deg.) | α (deg.) | D1 (mm) |
|---|---|---|---|---|---|---|---|
| 0.10 | 1.70 | 0.70 | 0.41 | 3.5 | 24.44 | 73.83 | 0.85 |

5th Example

Figure 7A:
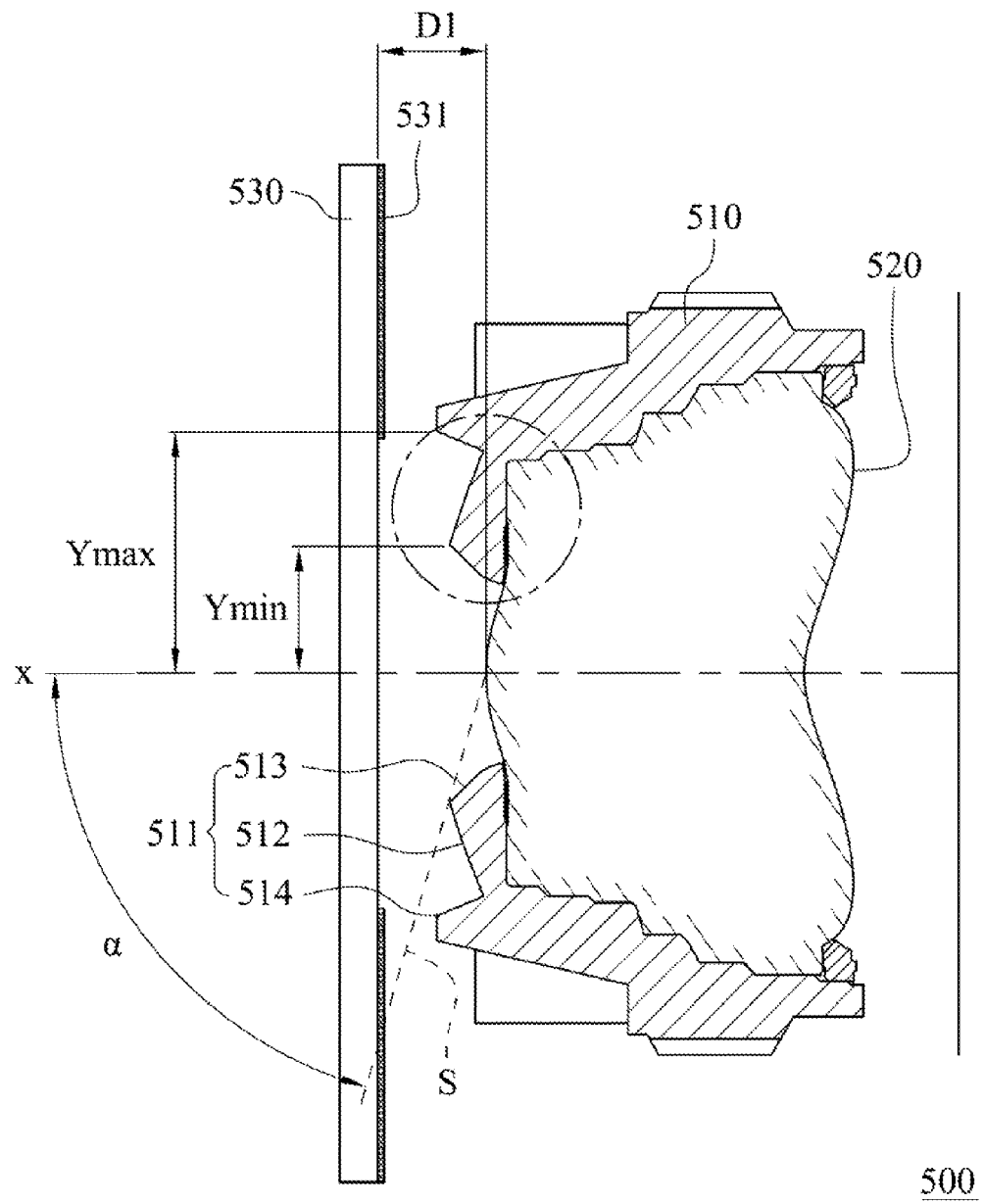
FIG. 7A shows a schematic view of an imaging lens assembly according to 5th example of the present disclosure.
Figure 7B:
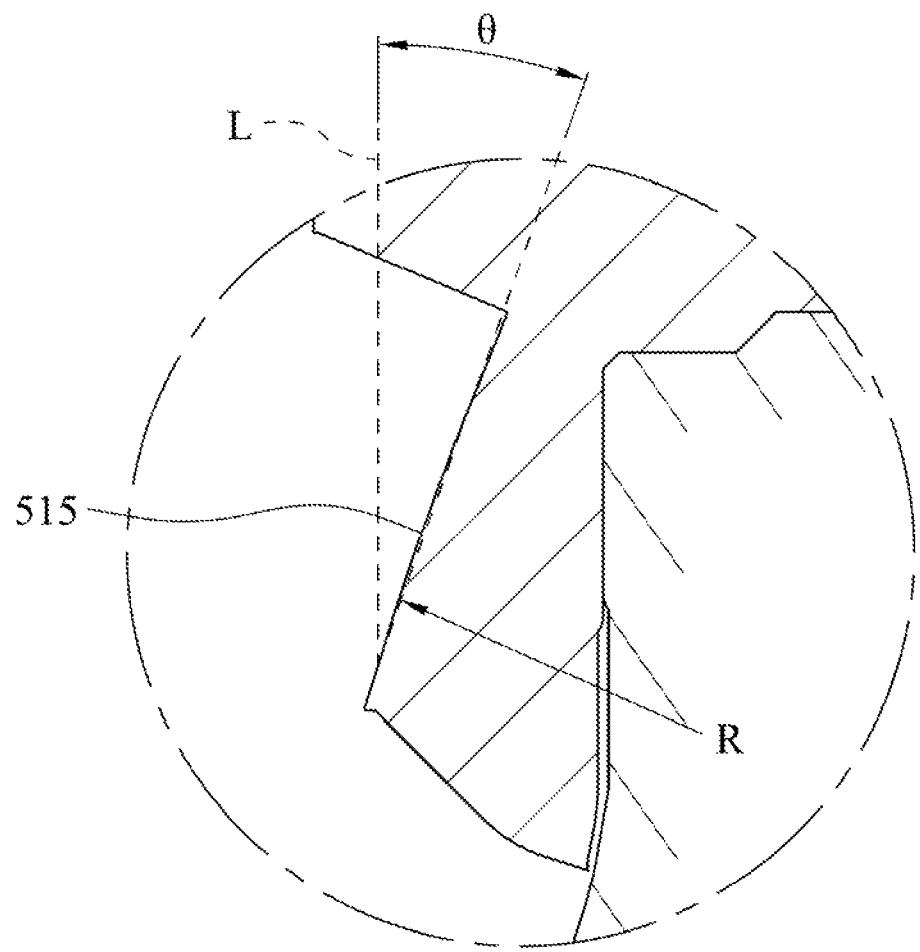
FIG. 7B shows an enlarged view of a specular region of the imaging lens assembly of FIG. 7A.

FIG. 7A shows a schematic view of an imaging lens assembly 500 according to 5th example of the present disclosure. FIG. 7B shows an enlarged view of a specular region 512 of the imaging lens assembly 500 of FIG. 7A. In FIGS. 7A and 7B, the imaging lens assembly 500 includes a barrel 510, a lens assembly 520 and a cover glass 530, wherein the lens assembly 520 is disposed in the barrel 510, and the cover glass 530 is located on an incident light side of the barrel 510. The barrel 510 has an incident light surface 511 and a barrel cylindrical axis X, wherein the incident light surface 511 includes a specular region 512, an inner circular region 513 and an outer circular region 514. The inner circular region 513 is connected to the specular region 512 and is closer to the barrel cylindrical axis X than the specular region 512. The outer circular region 514 is connected to the specular region 512 and is farther from the barrel cylindrical axis X than the specular region 512. The specular region 512 includes a specular protrusion region 515 disposed thereon, and the specular protrusion region 515 has a curved surface. The inner circular region 513 includes a light diminishing structure formed by a surface roughening process in 5th example. A light-limiting element 531 is arranged on the cover glass 530.

In the imaging lens assembly according to the 5th example, the definitions of the following parameters are the same as those stated in the 4th example with corresponding values for the 5th example. The values of SR, Ymax, Ymax−Ymin, (Ymax−Ymin)/Ymax, R, θ, α and D1 are shown in Table 5 as follows.

TABLE 5

5th Example

| SR (μm) | Ymax (mm) | Ymax − Ymin (mm) | (Ymax − Ymin)/ Ymax | R (mm) | θ (deg.) | α (deg.) | D1 (mm) |
|---|---|---|---|---|---|---|---|
| 0.05 | 1.90 | 0.90 | 0.47 | 6.0 | 19.80 | 73.83 | 0.85 |

6th Example

Figure 8A:
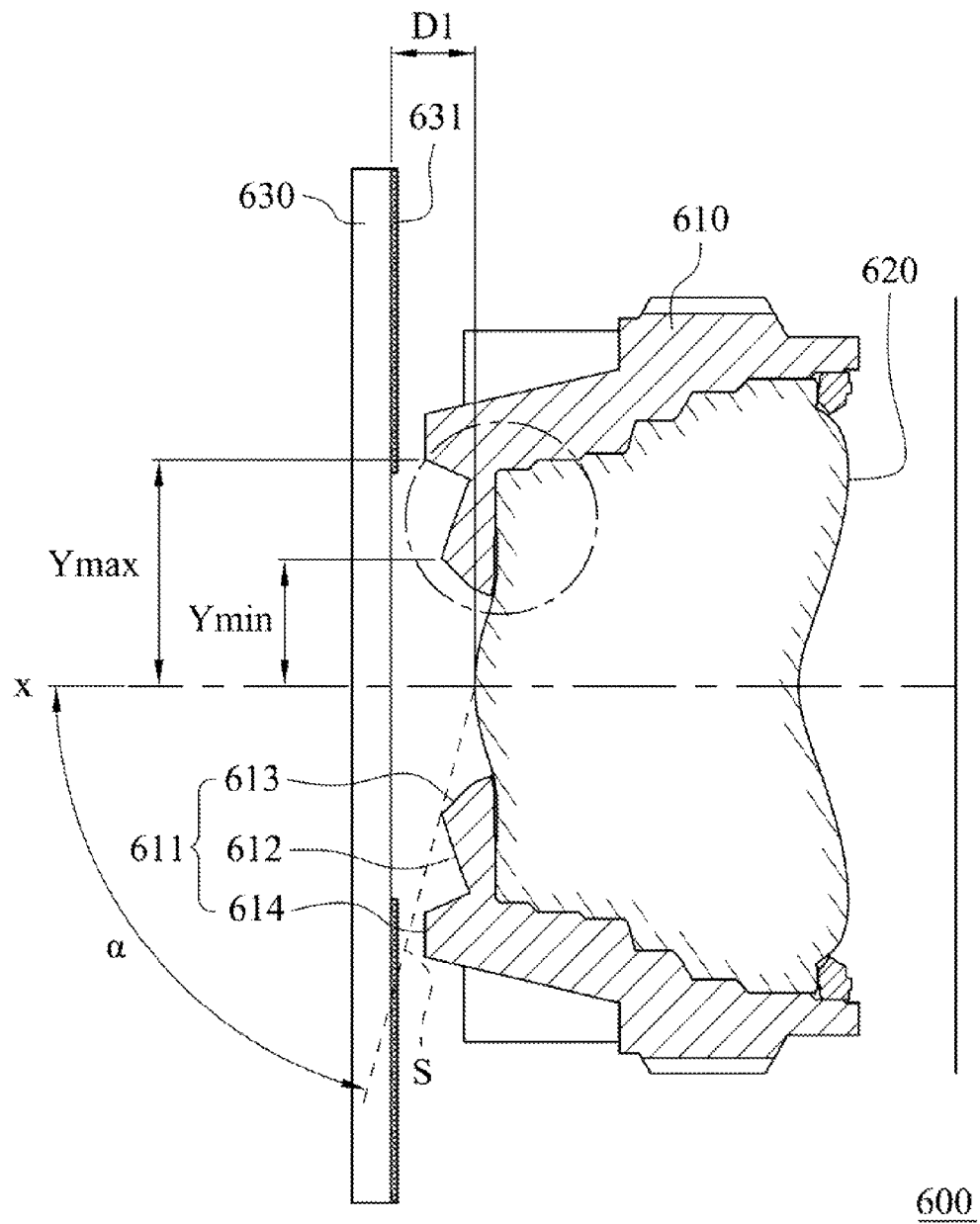
FIG. 8A shows a schematic view of an imaging lens assembly according to 6th example of the present disclosure.

FIG. 8A shows a schematic view of an imaging lens assembly 600 according to 6th example of the present disclosure.

Figure 8B:
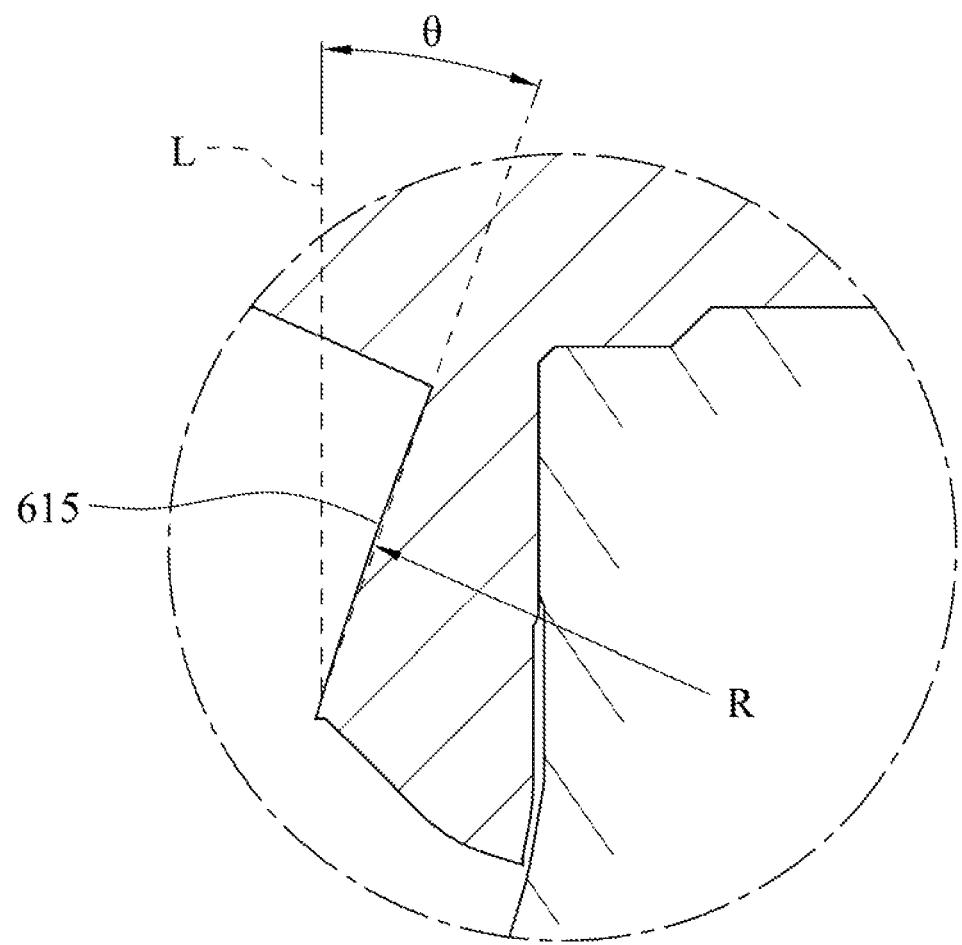
FIG. 8B shows an enlarged view of a specular region of the imaging lens assembly of FIG. 8A.

FIG. 8B shows an enlarged view of a specular region 612 of the imaging lens assembly 600 of FIG. 8A. In FIGS. 8A and 8B, the imaging lens assembly 600 includes a barrel 610, a lens assembly 620 and a cover glass 630, wherein the lens assembly 620 is disposed in the barrel 610, and the cover glass 630 is located on an incident light side of the barrel 610. The barrel 610 has an incident light surface 611 and a barrel cylindrical axis X, wherein the incident light surface 611 includes a specular region 612, an inner circular region 613 and an outer circular region 614. The inner circular region 613 is connected to the specular region 612 and is closer to the barrel cylindrical axis X than the specular region 612. The outer circular region 614 is connected to the specular region 612 and is farther from the barrel cylindrical axis X than the specular region 612. The specular region 612 includes a specular protrusion region 615 disposed thereon, and the specular protrusion region 615 has a curved surface. The inner circular region 613 includes a light diminishing structure formed by a surface roughening process in 6th example. A light-limiting element 631 is arranged on the cover glass 630.

In the imaging lens assembly according to the 6th example, the definitions of the following parameters are the same as those stated in the 4th example with corresponding values for the 6th example. The values of SR, Ymax, Ymax−Ymin, (Ymax−Ymin)/Ymax, R, θ, α and D1 are shown in Table 6 as follows.

TABLE 6

6th Example

| SR (μm) | Ymax (mm) | Ymax − Ymin (mm) | (Ymax − Ymin)/ Ymax | R (mm) | θ (deg.) | α (deg.) | D1 (mm) |
| --- | --- | --- | --- | --- | --- | --- | --- |
| 0.10 | 1.75 | 0.78 | 0.45 | 7.0 | 19.39 | 75.07 | 0.65 |

7th Example

Figure 9A:
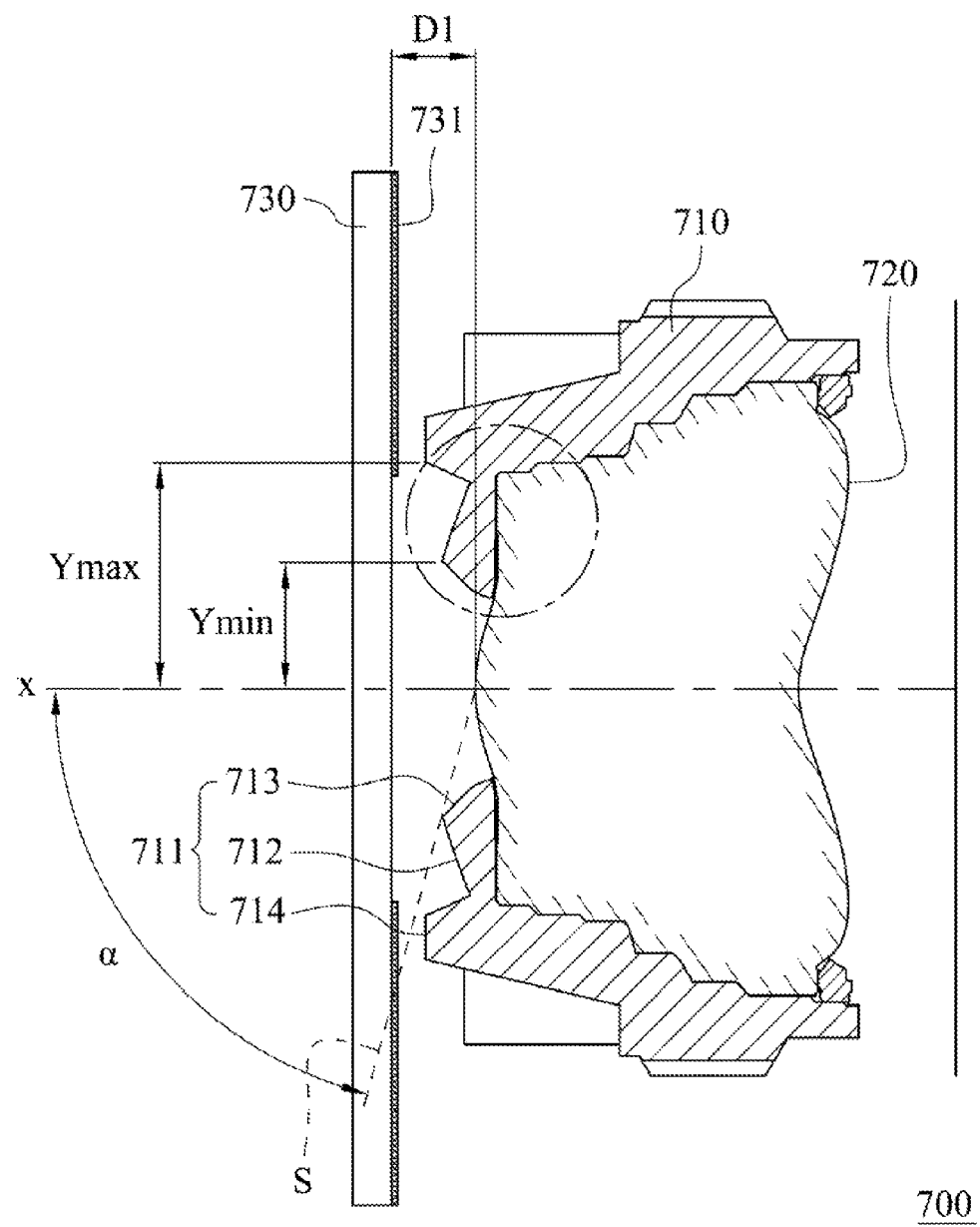
FIG. 9A shows a schematic view of an imaging lens assembly according to 7th example of the present disclosure.
Figure 9B:
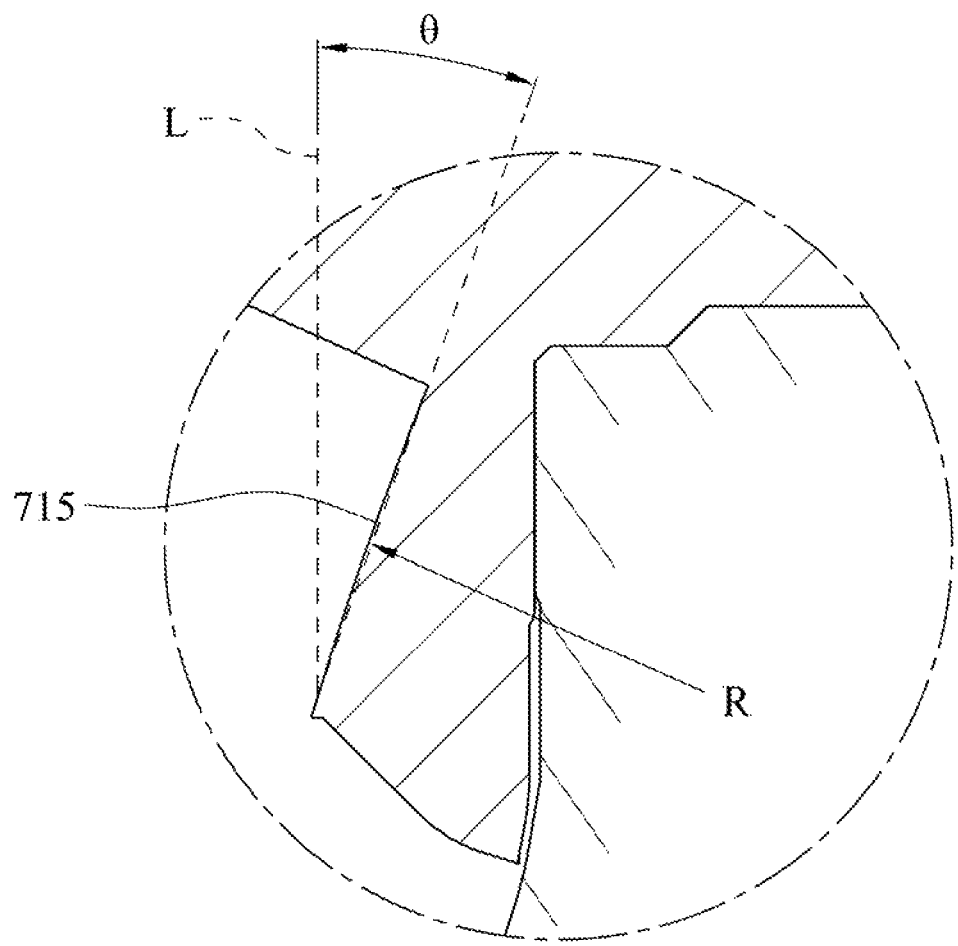
FIG. 9B shows an enlarged view of a specular region of the imaging lens assembly of FIG. 9A.

FIG. 9A shows a schematic view of an imaging lens assembly 700 according to 7th example of the present disclosure. FIG. 9B shows an enlarged view of a specular region 712 of the imaging lens assembly 700 of FIG. 9A. In FIGS. 9A and 9B, the imaging lens assembly 700 includes a barrel 710, a lens assembly 720 and a cover glass 730, wherein the lens assembly 720 is disposed in the barrel 710, and the cover glass 730 is located on an incident light side of the barrel 710. The barrel 710 has an incident light surface 711 and a barrel cylindrical axis X, wherein the incident light surface 711 includes a specular region 712, an inner circular region 713 and an outer circular region 714. The inner circular region 713 is connected to the specular region 712 and is closer to the barrel cylindrical axis X than the specular region 712. The outer circular region 714 is connected to the specular region 712 and is farther from the barrel cylindrical axis X than the specular region 712. The specular region 712 includes a specular protrusion region 715 disposed thereon, and the specular protrusion region 715 has a curved surface. Both of the inner circular region 713 and the outer circular region 714 include a light diminishing structure formed by a surface roughening process in 7th example, respectively. A light-limiting element 731 is arranged on the cover glass 730.

In the imaging lens assembly according to the 7th example, the definitions of the following parameters are the same as those stated in the 4th example with corresponding values for the 7th example. The values of SR, Ymax, Ymax−Ymin, (Ymax−Ymin)/Ymax, R, θ, α and D1 are shown in Table 7 as follows.

TABLE 7

7th Example

| SR (μm) | Ymax (mm) | Ymax − Ymin (mm) | (Ymax − Ymin)/ Ymax | R (mm) | θ (deg.) | α (deg.) | D1 (mm) |
| --- | --- | --- | --- | --- | --- | --- | --- |
| 0.10 | 1.60 | 0.63 | 0.39 | 7.0 | 19.39 | 75.07 | 0.65 |

8th Example

Figure 10A:
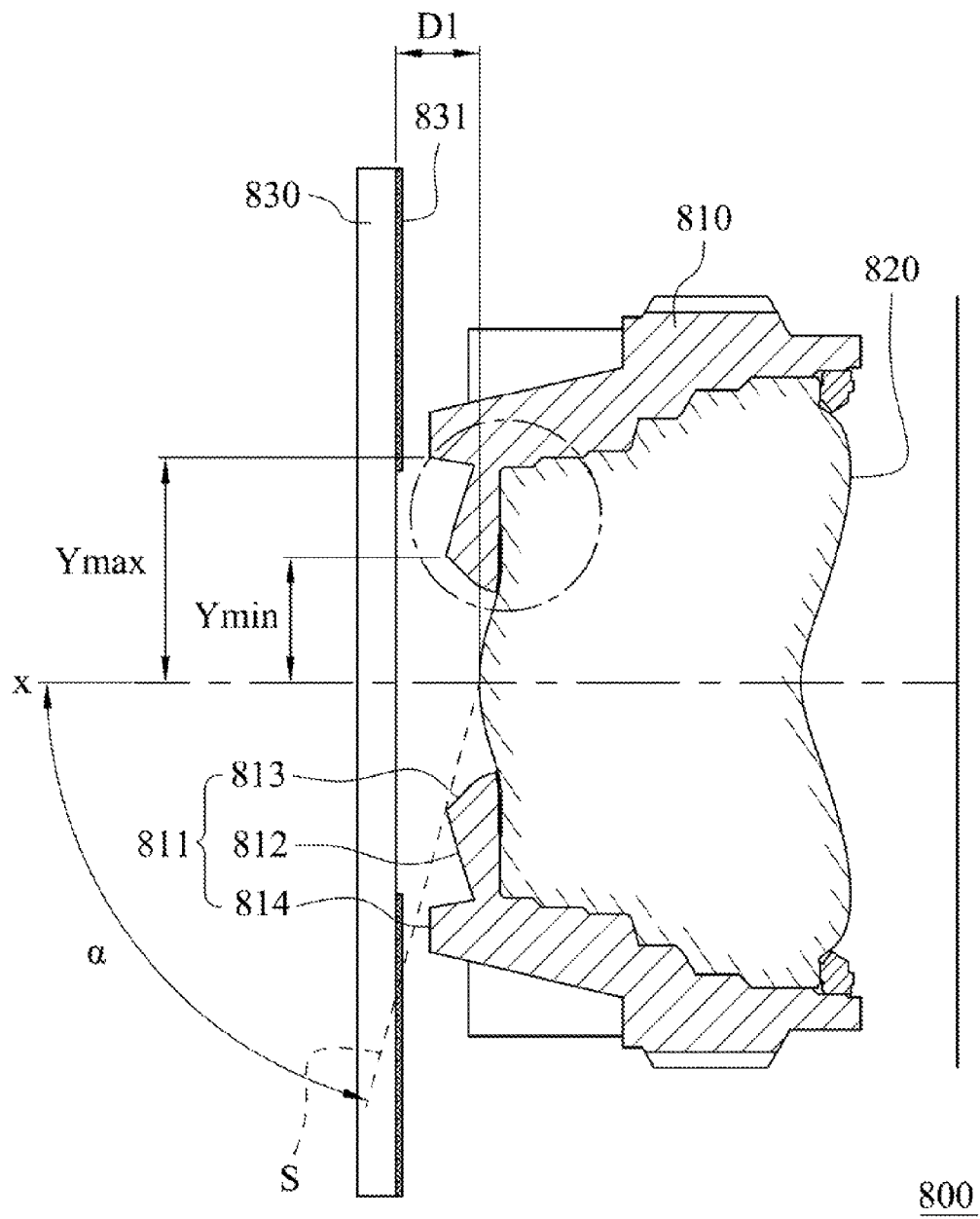
FIG. 10A shows a schematic view of an imaging lens assembly according to 8th example of the present disclosure.
Figure 10B:
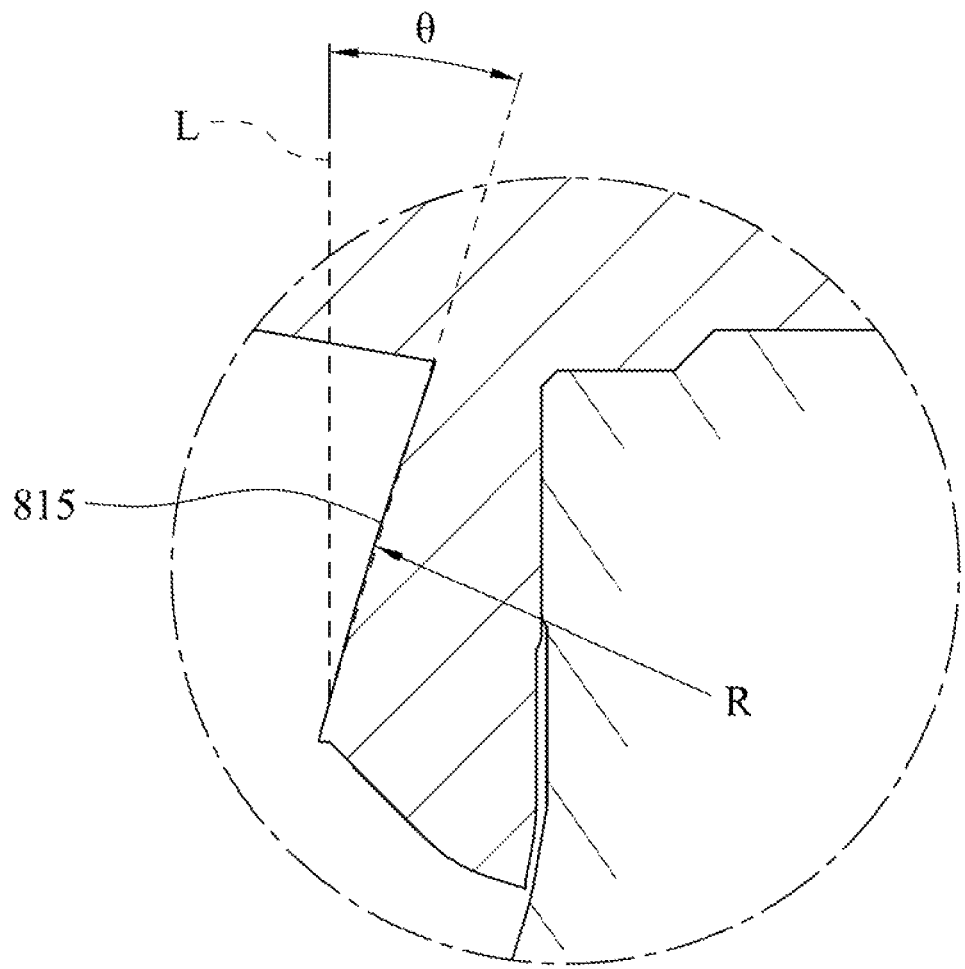
FIG. 10B shows an enlarged view of a specular region of the imaging lens assembly of FIG. 10A.

FIG. 10A shows a schematic view of an imaging lens assembly 800 according to 8th example of the present disclosure. FIG. 10B shows an enlarged view of a specular region 812 of the imaging lens assembly 800 of FIG. 10A. In FIGS. 10A and 10B, the imaging lens assembly 800 includes a barrel 810, a lens assembly 820 and a cover glass 830, wherein the lens assembly 820 is disposed in the barrel 810, and the cover glass 830 is located on an incident light side of the barrel 810. The barrel 810 has an incident light surface 811 and a barrel cylindrical axis X, wherein the incident light surface 811 includes a specular region 812, an inner circular region 813 and an outer circular region 814. The inner circular region 813 is connected to the specular region 812 and is closer to the barrel cylindrical axis X than the specular region 812. The outer circular region 814 is connected to the specular region 812 and is farther from the barrel cylindrical axis X than the specular region 812. The specular region 812 includes a specular protrusion region 815 disposed thereon, and the specular protrusion region 815 has a curved surface. The inner circular region 813 includes a light diminishing structure formed by a surface roughening process in 8th example. A light-limiting element 831 is arranged on the cover glass 830.

In the imaging lens assembly according to the 8th example, the definitions of the following parameters are the same as those stated in the 4th example with corresponding values for the 8th example. The values of SR, Ymax, Ymax−Ymin, (Ymax−Ymin)/Ymax, R, θ, α and D1 are shown in Table 8 as follows.

TABLE 8

8th Example

| SR (μm) | Ymax (mm) | Ymax − Ymin (mm) | (Ymax − Ymin)/ Ymax | R (mm) | θ (deg.) | α (deg.) | D1 (mm) |
| --- | --- | --- | --- | --- | --- | --- | --- |
| 0.08 | 1.75 | 0.78 | 0.45 | 8.0 | 17.08 | 75.07 | 0.65 |

9th Example

Figure 11A:
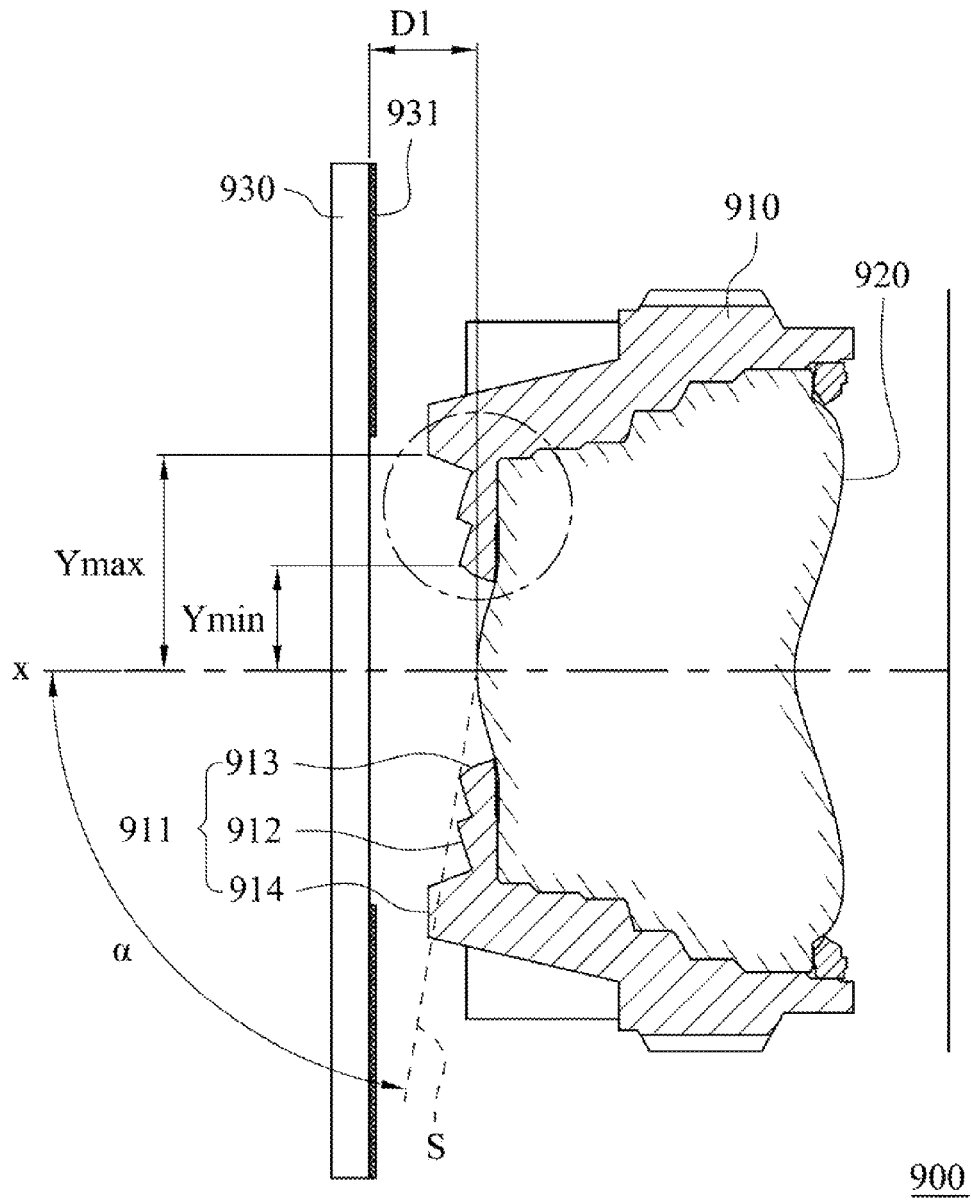
FIG. 11A shows a schematic view of an imaging lens assembly according to 9th example of the present disclosure.
Figure 11B:
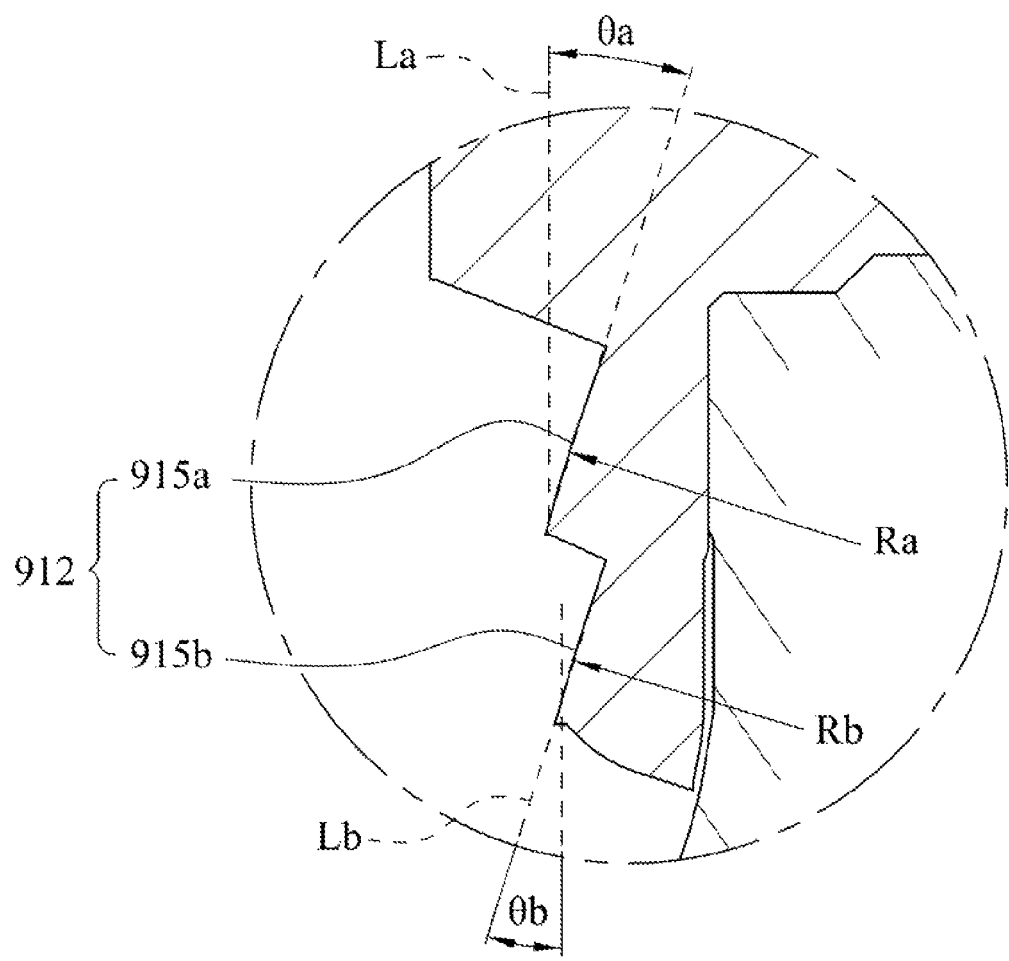
FIG. 11B shows an enlarged view of a specular region of the imaging lens assembly of FIG. 11A.

FIG. 11A shows a schematic view of an imaging lens assembly 900 according to 9th example of the present disclosure. FIG. 11B shows an enlarged view of a specular region 912 of the imaging lens assembly 900 of FIG. 11A. In FIGS. 11A and 11B, the imaging lens assembly 900 includes a barrel 910, a lens assembly 920 and a cover glass 930, wherein the lens assembly 920 is disposed in the barrel 910, and the cover glass 930 is located on an incident light side of the barrel 910. The barrel 910 has an incident light surface 911 and a barrel cylindrical axis X, wherein the incident light surface 911 includes a specular region 912, an inner circular region 913 and an outer circular region 914. The inner circular region 913 is connected to the specular region 912 and is closer to the barrel cylindrical axis X than the specular region 912. The outer circular region 914 is connected to the specular region 912 and is farther from the barrel cylindrical axis X than the specular region 912. The specular region 912 includes two specular protrusion regions 915a, 915b disposed thereon, and each of the specular protrusion regions 915a, 915b has a curved surface. The inner circular region 913 includes a light diminishing structure formed by a surface roughening process in 9th example. A light-limiting element 931 is arranged on the cover glass 930.

In the imaging lens assembly according to the 9th example, the definitions of SR, Ymax, Ymax−Ymin, (Ymax−Ymin)/Ymax, α and D1 are the same as those stated in the 4th example, and the definitions of Ra, Rb, θa and θb are the same as those stated in the 3th example. The values are shown in Table 9 as follows.

TABLE 9

9th Example

| SR (μm) | Ymax (mm) | Ymax − Ymin (mm) | (Ymax − Ymin)/Ymax | R (mm) | | θ (deg.) | | α (deg.) | D1 (mm) |
|---|---|---|---|---|---|---|---|---|---|
| 0.08 | 1.70 | 0.87 | 0.51 | Ra | 3.0 | θa | 17.35 | 80.43 | 0.80 |
| | | | | Rb | 3.0 | θb | 17.97 | | |

10th Example

Figure 12A:
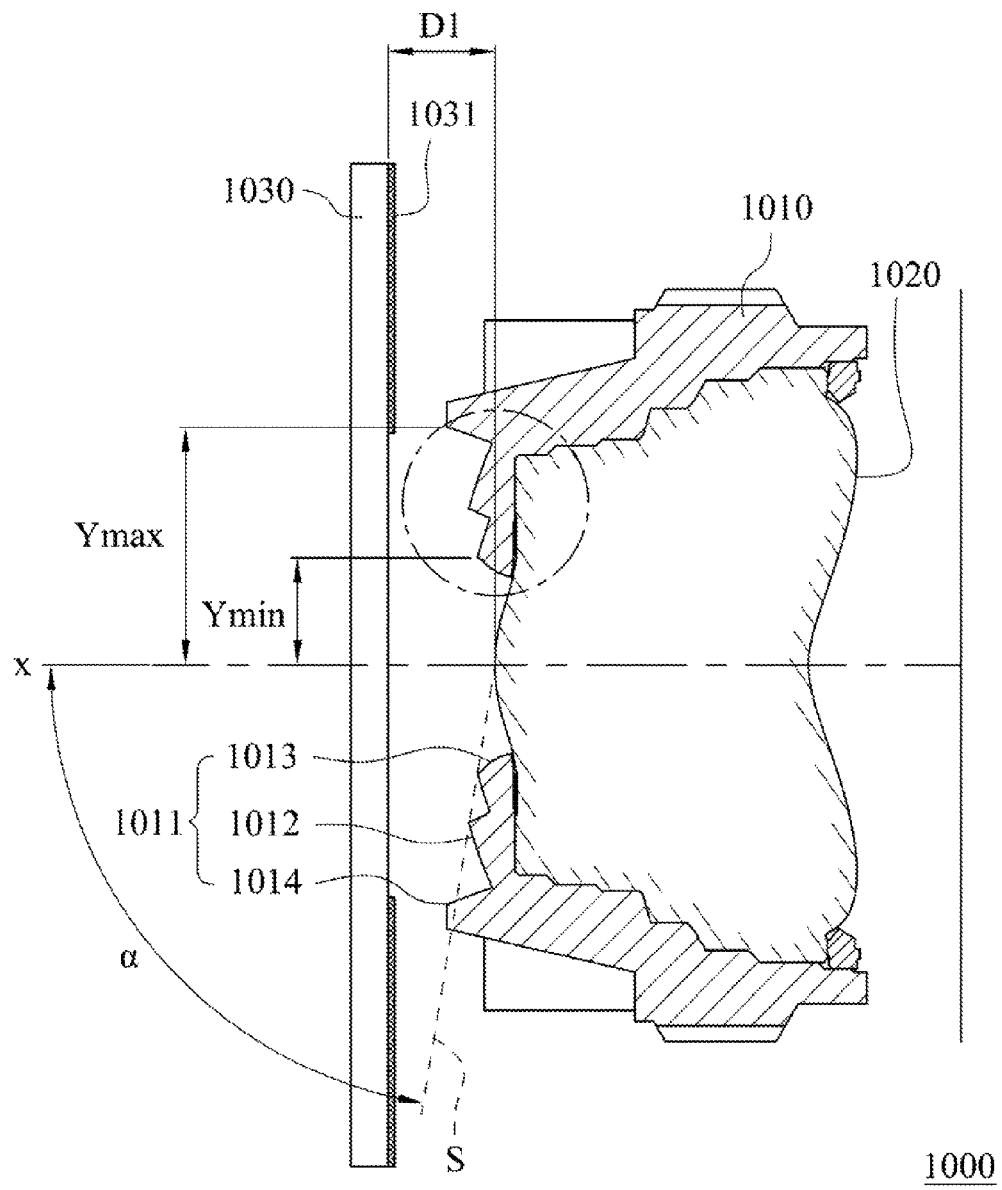
FIG. 12A shows a schematic view of an imaging lens assembly according to 10th example of the present disclosure.
Figure 12B:
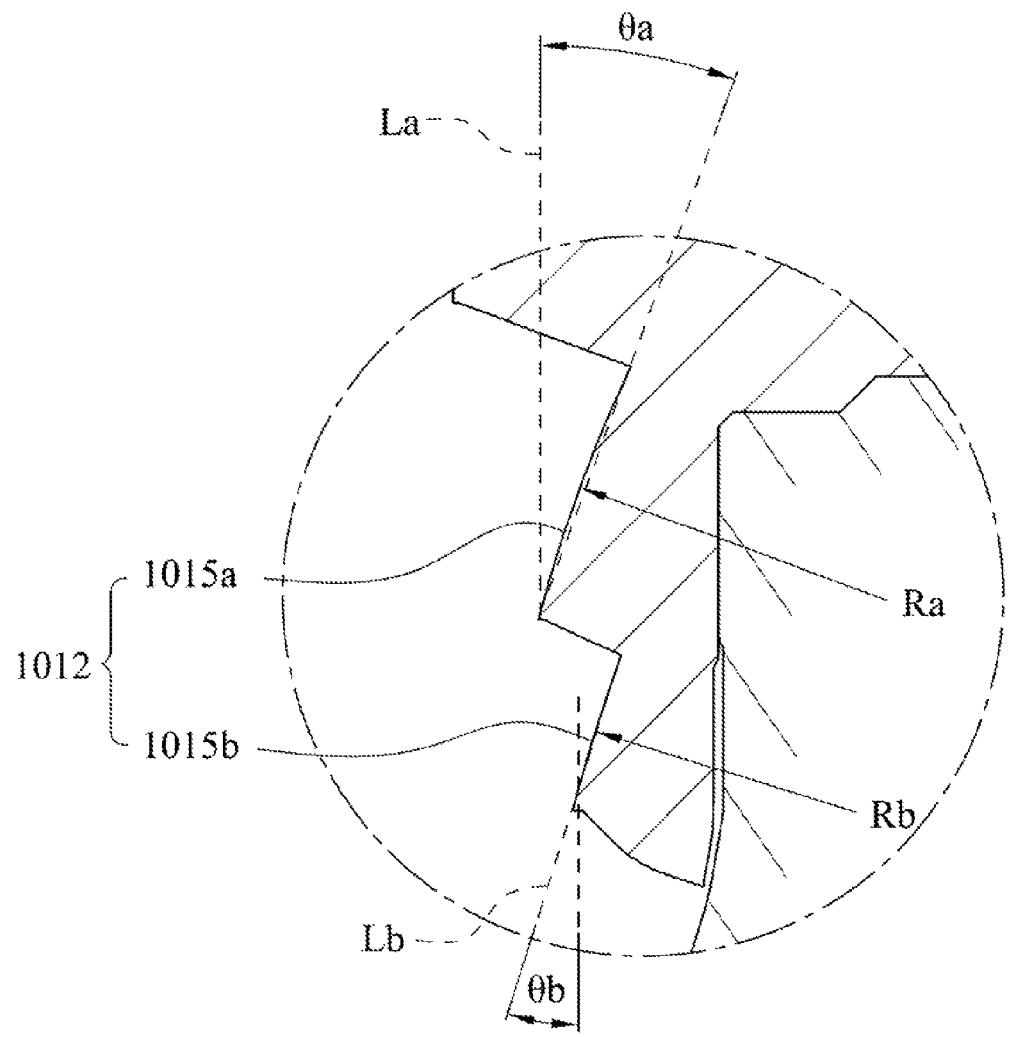
FIG. 12B shows an enlarged view of a specular region of the imaging lens assembly of FIG. 12A.

FIG. 12A shows a schematic view of an imaging lens assembly 1000 according to 10th example of the present disclosure. FIG. 12B shows an enlarged view of a specular region 1012 of the imaging lens assembly 1000 of FIG. 12A. In FIGS. 12A and 12B, the imaging lens assembly 1000 includes a barrel 1010, a lens assembly 1020 and a cover glass 1030, wherein the lens assembly 1020 is disposed in the barrel 1010, and the cover glass 1030 is located on an incident light side of the barrel 1010. The barrel 1010 has an incident light surface 1011 and a barrel cylindrical axis X, wherein the incident light surface 1011 includes a specular region 1012, an inner circular region 1013 and an outer circular region 1014. The inner circular region 1013 is connected to the specular region 1012 and is closer to the barrel cylindrical axis X than the specular region 1012. The outer circular region 1014 is connected to the specular region 1012 and is farther from the barrel cylindrical axis X than the specular region 1012. The specular region 1012 includes two specular protrusion regions 1015a, 1015b disposed thereon, and each of the specular protrusion regions 1015a, 1015b has a curved surface. The inner circular region 1013 includes a light diminishing structure formed by a surface roughening process in 10th example. A light-limiting element 1031 is arranged on the cover glass 1030.

In the imaging lens assembly according to the 10th example, the definitions of SR, Ymax, Ymax−Ymin, (Ymax−Ymin)/Ymax, α and D1 are the same as those stated in the 4th example, and the definitions of Ra, Rb, θa and θb are the same as those stated in the 3th example. The values are shown in Table 10 as follows.

TABLE 10

10th Example

| SR (μm) | Ymax (mm) | Ymax − Ymin (mm) | (Ymax − Ymin)/Ymax | R (mm) | | θ (deg.) | | α (deg.) | D1 (mm) |
|---|---|---|---|---|---|---|---|---|---|
| 0.10 | 1.90 | 1.05 | 0.55 | Ra | 3.0 | θa | 17.35 | 80.70 | 0.85 |
| | | | | Rb | 3.0 | θb | 20.07 | | |

11th Example

Figure 13A:
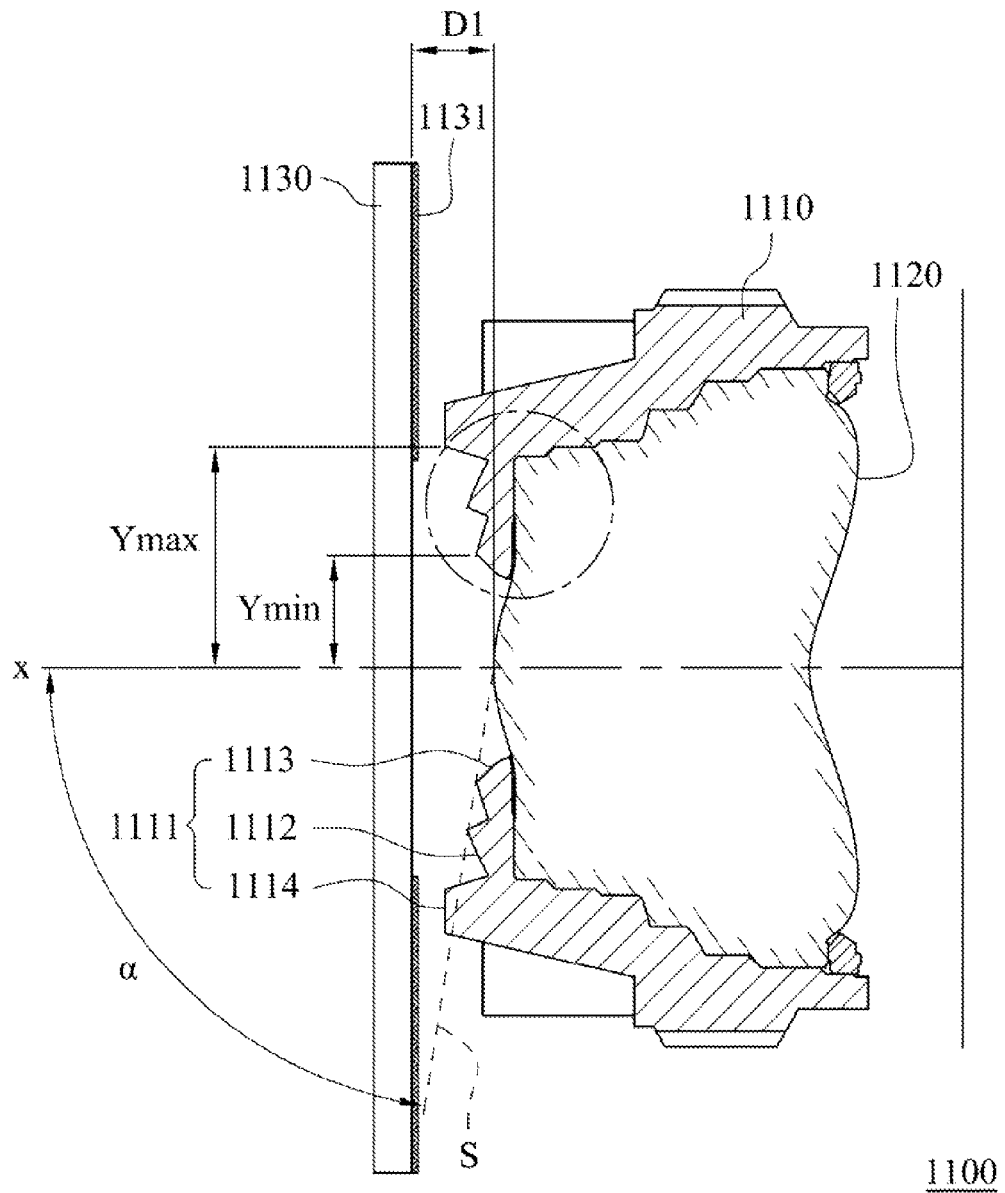
FIG. 13A shows a schematic view of an imaging lens assembly according to 11th example of the present disclosure.
Figure 13B:
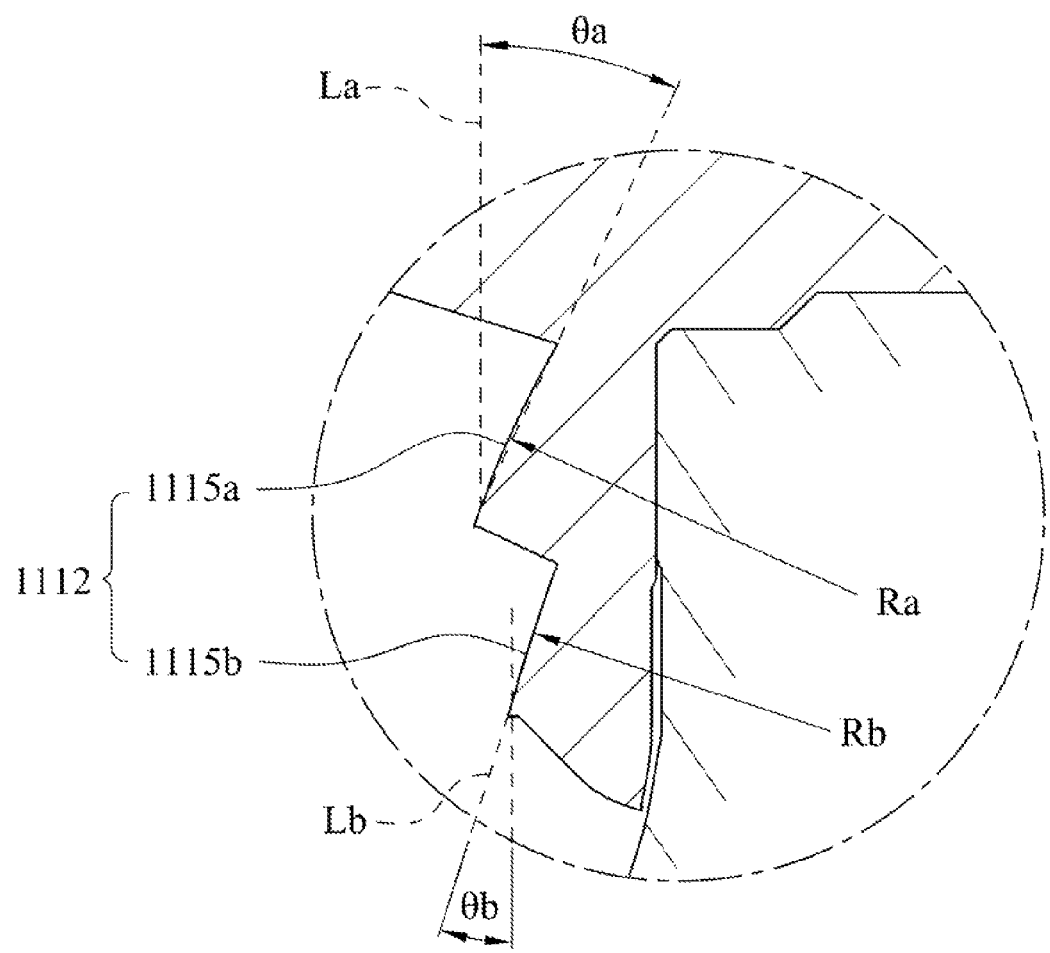
FIG. 13B shows an enlarged view of a specular region of the imaging lens assembly of FIG. 13A.

FIG. 13A shows a schematic view of an imaging lens assembly 1100 according to 11th example of the present disclosure. FIG. 13B shows an enlarged view of a specular region 1112 of the imaging lens assembly 1100 of FIG. 13A. In FIGS. 13A and 13B, the imaging lens assembly 1100 includes a barrel 1110, a lens assembly 1120 and a cover glass 1130, wherein the lens assembly 1120 is disposed in the barrel 1110, and the cover glass 1130 is located on an incident light side of the barrel 1110. The barrel 1110 has an incident light surface 1111 and a barrel cylindrical axis X, wherein the incident light surface 1111 includes a specular region 1112, an inner circular region 1113 and an outer circular region 1114. The inner circular region 1113 is connected to the specular region 1112 and is closer to the barrel cylindrical axis X than the specular region 1112. The outer circular region 1114 is connected to the specular region 1112 and is farther from the barrel cylindrical axis X than the specular region 1112. The specular region 1112 includes two specular protrusion regions 1115a, 1115b disposed thereon, and each of the specular protrusion regions 1115a, 1115b has a curved surface. The inner circular region 1113 includes a light diminishing structure formed by a surface roughening process in 11th example. A light-limiting element 1131 is arranged on the cover glass 1130.

In the imaging lens assembly according to the 11th example, the definitions of SR, Ymax, Ymax−Ymin, (Ymax−Ymin)/Ymax, α and D1 are the same as those stated in the 4th example, and the definitions of Ra, Rb, θa and θb are the same as those stated in the 3th example. The values are shown in Table 11 as follows.

TABLE 11

11th Example

| SR (μm) | Ymax (mm) | Ymax − Ymin (mm) | (Ymax − Ymin)/Ymax | R (mm) | | θ (deg.) | | α (deg.) | D1 (mm) |
|---|---|---|---|---|---|---|---|---|---|
| 0.12 | 1.75 | 0.86 | 0.49 | Ra | 2.5 | θa | 17.88 | 81.06 | 0.65 |
| | | | | Rb | 2.0 | θb | 24.68 | | |

12th Example

Figure 14A:
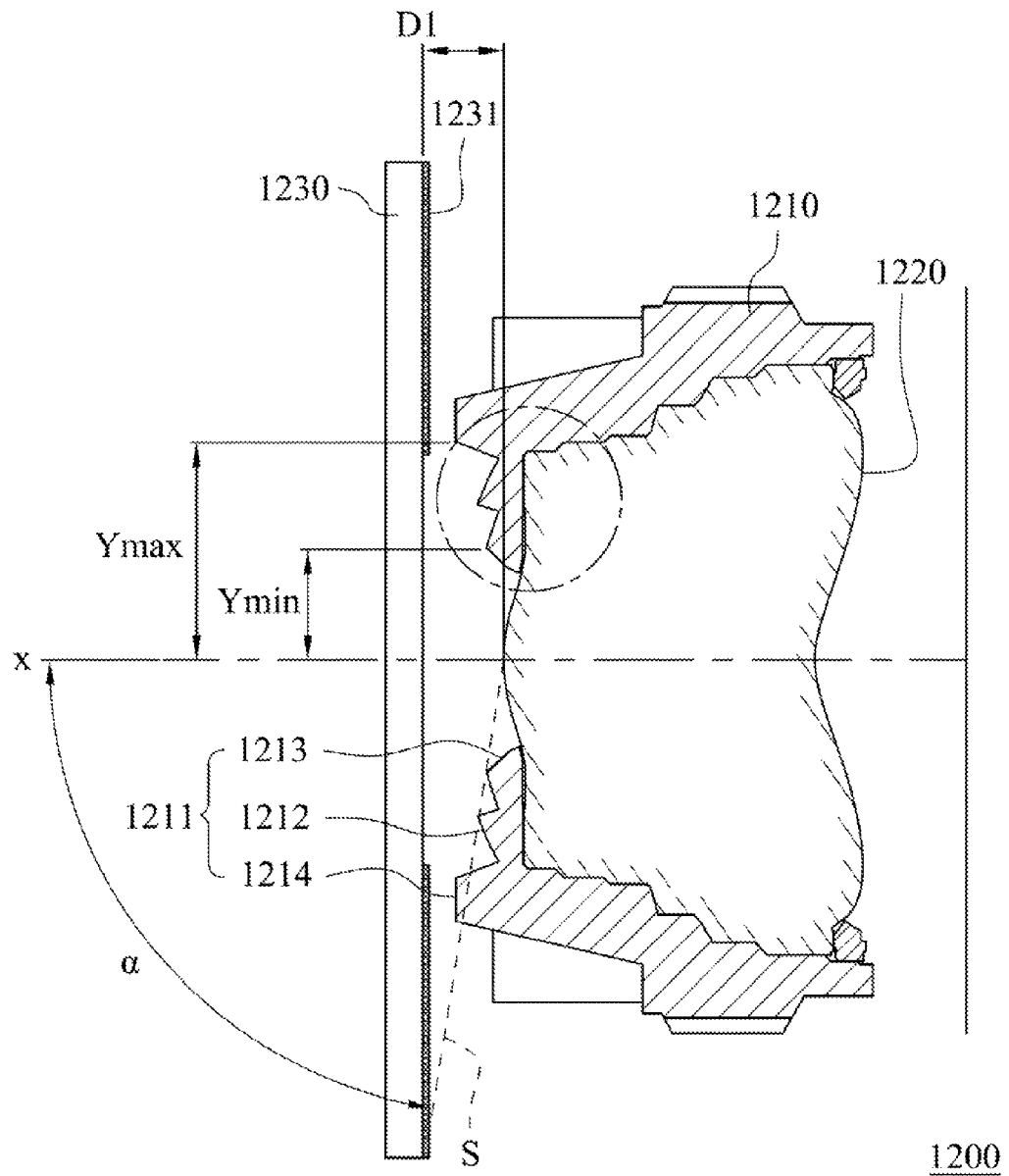
FIG. 14A shows a schematic view of an imaging lens assembly according to 12th example of the present disclosure.
Figure 14B:
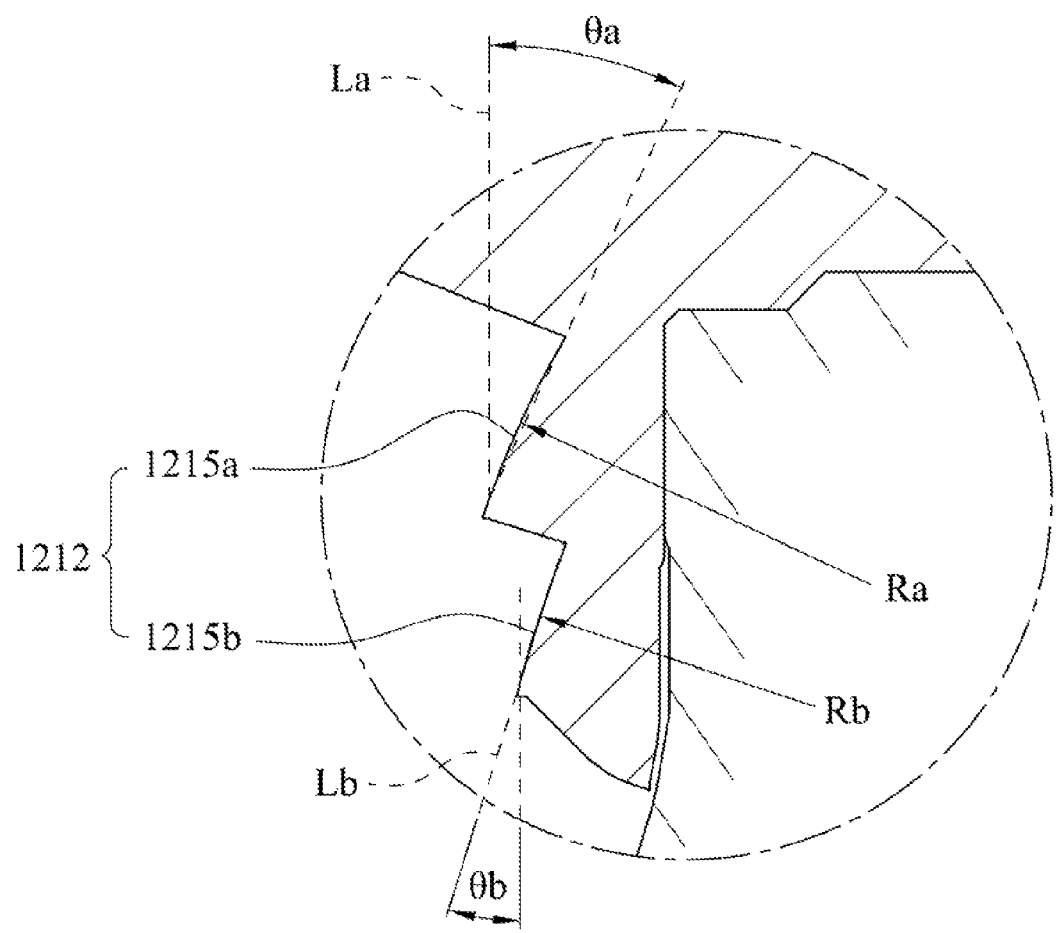
FIG. 14B shows an enlarged view of a specular region of the imaging lens assembly of FIG. 14A.

FIG. 14A shows a schematic view of an imaging lens assembly 1200 according to 12th example of the present disclosure. FIG. 14B shows an enlarged view of a specular region 1212 of the imaging lens assembly 1200 of FIG. 14A. In FIGS. 14A and 14B, the imaging lens assembly 1200 includes a barrel 1210, a lens assembly 1220 and a cover glass 1230, wherein the lens assembly 1220 is disposed in the barrel 1210, and the cover glass 1230 is located on an incident light side of the barrel 1210. The barrel 1210 has an incident light surface 1211 and a barrel cylindrical axis X, wherein the incident light surface 1211 includes a specular region 1212, an inner circular region 1213 and an outer circular region 1214. The inner circular region 1213 is connected to the specular region 1212 and is closer to the barrel cylindrical axis X than the specular region 1212. The outer circular region 1214 is connected to the specular region 1212 and is farther from the barrel cylindrical axis X than the specular region 1212. The specular region 1212 includes two specular protrusion regions 1215a, 1215b disposed thereon, and each of the specular protrusion regions 1215a, 1215b has a curved surface. Both of the inner circular region 1213 and the outer circular region 1214 include a light diminishing structure formed by a surface roughening process in 12th example, respectively. A light-limiting element 1231 is arranged on the cover glass 1230.

In the imaging lens assembly according to the 12th example, the definitions of SR, Ymax, Ymax−Ymin, (Ymax−Ymin)/Ymax, α and D1 are the same as those stated in the 4th example, and the definitions of Ra, Rb, θa and θb are the same as those stated in the 3th example. The values are shown in Table 12 as follows.

TABLE 12

12th Example

| SR (μm) | Ymax (mm) | Ymax − Ymin (mm) | (Ymax − Ymin)/ Ymax | R (mm) | | θ (deg.) | | α (deg.) | D1 (mm) |
|---|---|---|---|---|---|---|---|---|---|
| 0.20 | 1.62 | 0.73 | 0.45 | Ra | 2.5 | θa | 17.88 | 81.02 | 0.65 |
|  |  |  |  | Rb | 2.0 | θb | 24.68 |  |  |

13th Example

Figure 15A:
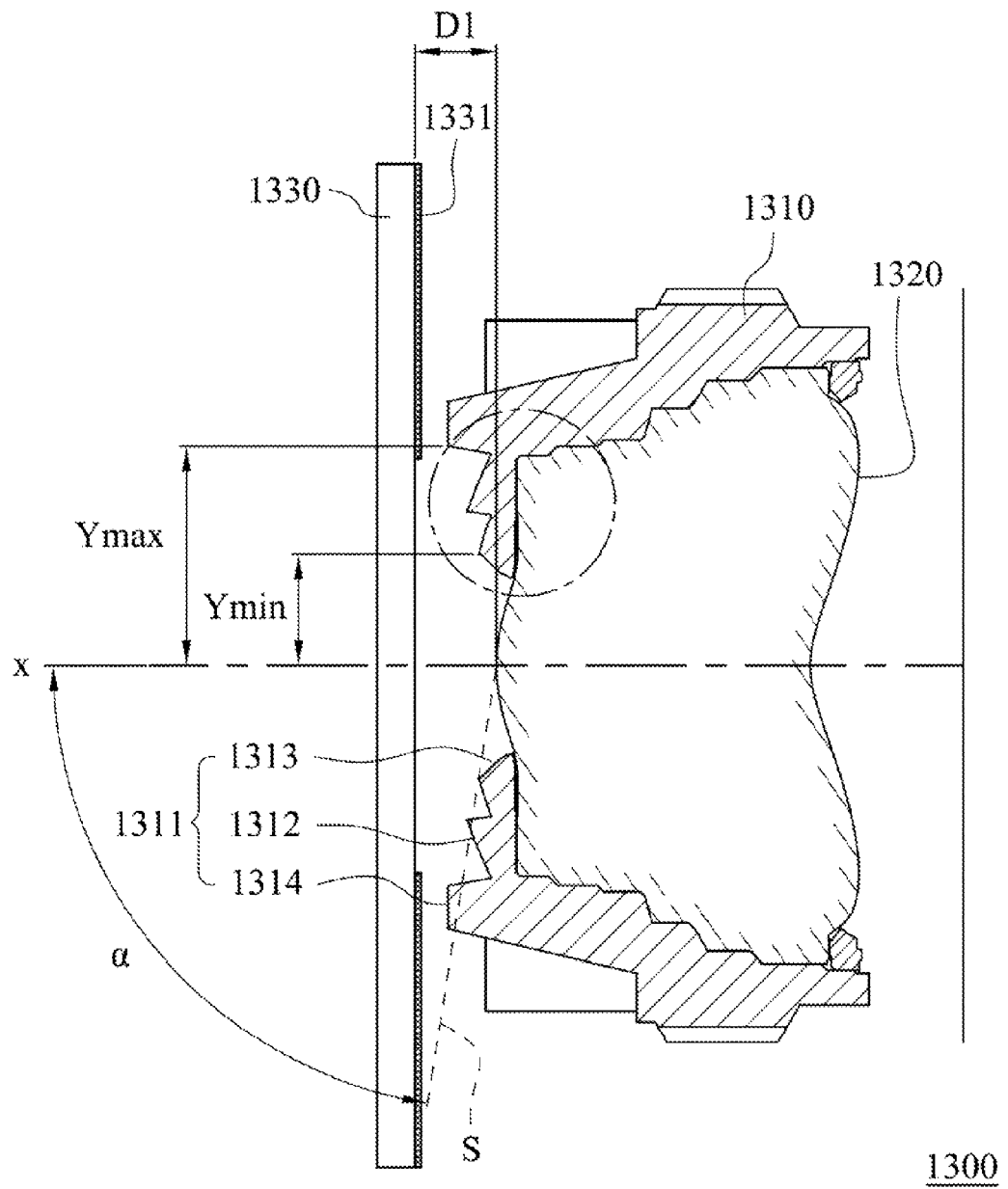
FIG. 15A shows a schematic view of an imaging lens assembly according to 13th example of the present disclosure.
Figure 15B:
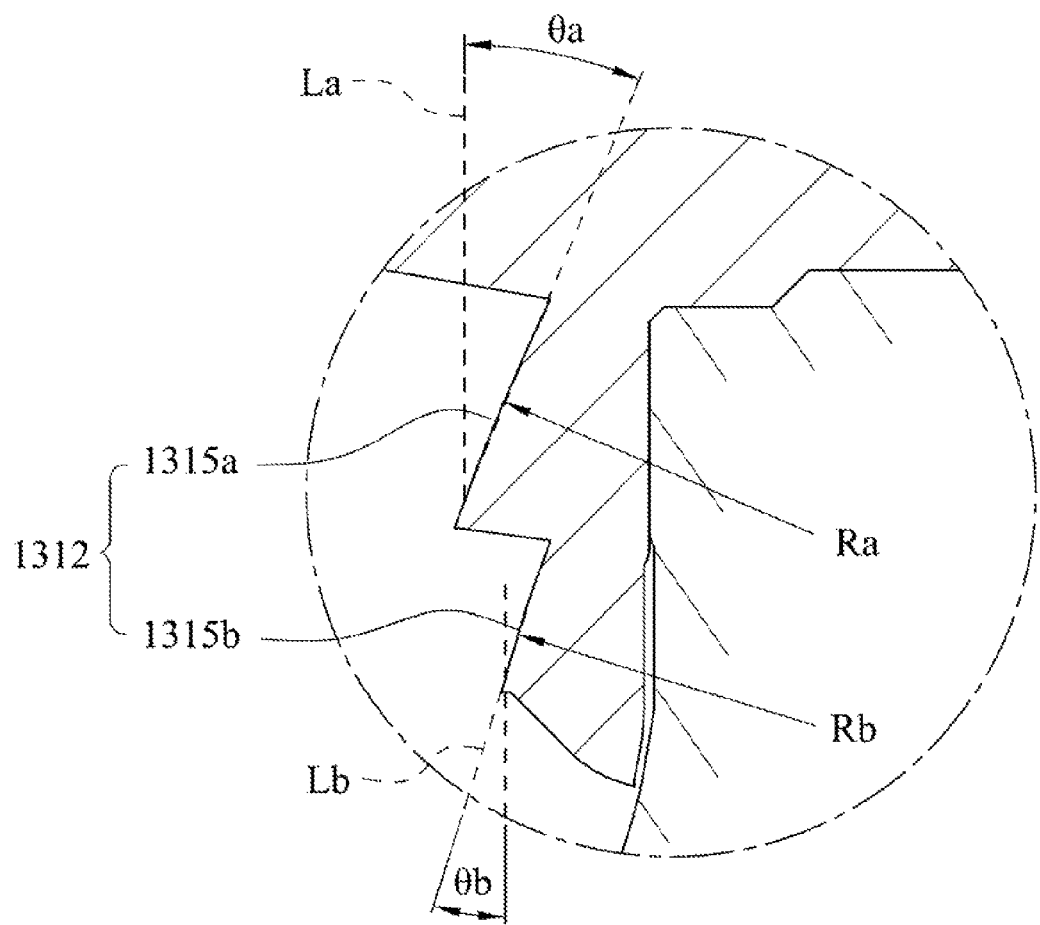
FIG. 15B shows an enlarged view of a specular region of the imaging lens assembly of FIG. 15A.

FIG. 15A shows a schematic view of an imaging lens assembly 1300 according to 13th example of the present disclosure. FIG. 15B shows an enlarged view of a specular region 1312 of the imaging lens assembly 1300 of FIG. 15A. In FIGS. 15A and 15B, the imaging lens assembly 1300 includes a barrel 1310, a lens assembly 1320 and a cover glass 1330, wherein the lens assembly 1320 is disposed in the barrel 1310, and the cover glass 1330 is located on an incident light side of the barrel 1310. The barrel 1310 has an incident light surface 1311 and a barrel cylindrical axis X, wherein the incident light surface 1311 includes a specular region 1312, an inner circular region 1313 and an outer circular region 1314. The inner circular region 1313 is connected to the specular region 1312 and is closer to the barrel cylindrical axis X than the specular region 1312. The outer circular region 1314 is connected to the specular region 1312 and is farther from the barrel cylindrical axis X than the specular region 1312. The specular region 1312 includes two specular protrusion regions 1315a, 1315b disposed thereon, and each of the specular protrusion regions 1315a, 1315b has a curved surface. The inner circular region 1313 includes a light diminishing structure formed by a surface roughening process in 13th example. A light-limiting element 1331 is arranged on the cover glass 1330.

In the imaging lens assembly according to the 13th example, the definitions of SR, Ymax, Ymax−Ymin, (Ymax−Ymin)/Ymax, α and D1 are the same as those stated in the 4th example, and the definitions of Ra, Rb, θa and θb are the same as those stated in the 3th example. The values are shown in Table 13 as follows.

TABLE 13

13th Example

| SR (μm) | Ymax (mm) | Ymax − Ymin (mm) | (Ymax − Ymin)/ Ymax | R (mm) | | θ (deg.) | | α (deg.) | D1 (mm) |
|---|---|---|---|---|---|---|---|---|---|
| 0.12 | 1.75 | 0.86 | 0.49 | Ra | 2.5 | θa | 17.88 | 81.06 | 0.65 |
|  |  |  |  | Rb | 4.0 | θb | 22.71 |  |  |

In FIGS. 3A, 3B to FIGS. 15A, 15B corresponding to the aforementioned 1st example to 13th example are drawn according to the practical scale.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents

What is claimed is:

1. An imaging lens assembly, comprising:
a barrel having an incident light surface and a barrel cylindrical axis, wherein the incident light surface comprises a specular region comprising at least one specular protrusion region disposed thereon, and an inner circular region, wherein the inner circular region is connected to the specular, region and is closer to the barrel cylindrical axis than the specular region, and the inner circular region comprises a light diminishing structure; and
a lens assembly disposed in the barrel;
wherein an angle between a shortest line from an innermost edge to an outermost edge of the specular protrusion region and a normal line to the barrel cylindrical axis is θ, a maximum vertical distance from the specular region to the barrel cylindrical axis is Ymax, a minimum vertical distance from the specular region to the barrel cylindrical axis is Ymin, and the following conditions are satisfied:

10 degrees θ<45 degrees; and 0.2<(Ymax−Ymin)/Ymax<0.8.

2. The imaging lens assembly of claim 1, wherein a surface roughness of the specular region is SR and the following condition is satisfied;

SR<1.0 μm.

3. The imaging lens assembly of claim 2, wherein the surface roughness of the specular region is SR and the following condition is satisfied:

SR<0.35 μm.

4. The imaging lens assembly of claim 3, wherein the surface roughness of the specular region is SR and the following condition is satisfied:

SR<0.15 μm.

5. The imaging lens assembly of claim 3, wherein the specular protrusion region has a curved surface, a curvature radius of the curved surface is R, and the following condition is satisfied:

0 mm<R<20 mm.

6. The imaging lens assembly of claim 5, wherein the specular protrusion region has the curved surface, the curvature radius of the curved surface is R, and the following condition is satisfied:

0 mm<R<10 mm.

7. The imaging lens assembly of claim 3, wherein the angle between the shortest line from the innermost edge to the outermost edge of the specular protrusion region and the normal line to the barrel cylindrical axis and the following condition is satisfied:

15 degrees<θ<30 degrees.

8. The imaging lens assembly of claim 3, wherein the specular region comprises at least two specular protrusion regions.

9. The imaging lens assembly of claim 1, wherein the incident light surface further comprises an outer circular region, the outer circular region is connected to the specular region and is farther from the barrel cylindrical axis than the specular region, wherein the outer circular region comprises a light diminishing structure.

10. The imaging lens assembly of claim 1, wherein the maximum vertical distance from the specular region to the barrel cylindrical axis is Ymax, the minimum vertical distance from the specular region to the barrel cylindrical axis is Ymin, and the following condition is satisfied:

0.4<(Ymax−Ymin)/Ymax<0.7.

11. The imaging lens assembly of claim 3, wherein an angle between a shortest line from an innermost edge of the specular region to an axial vertex nearest an incident light side of the lens assembly and the barrel cylindrical axis is α, and the following condition is satisfied:

60 degrees<α<90 degrees.

12. The imaging lens assembly of claim 1, wherein the angle between the shortest line from the innermost edge of the specular region to the axial vertex nearest the incident light side of the lens assembly and the barrel cylindrical axis is α, and the following condition is satisfied:

70 degrees<α<85 degrees.

13. The imaging lens assembly of claim 1, further comprising:
a cover glass located on an incident light side of the barrel, wherein a minimum distance on the barrel cylindrical axis between the cover glass and the lens assembly is D1, and the following condition is satisfied:

0 mm<D1<2.0 mm.

14. A mobile device, comprising:
an imaging lens assembly comprising:
a barrel having an incident light surface and a barrel cylindrical axis, wherein the incident light surface comprises a specular region comprising at least one specular protrusion region disposed thereon, and an inner circular region, wherein the inner circular region is connected to the specular region and is closer to the barrel cylindrical axis than the specular region, and the inner circular region comprises a light diminishing structure; and
a lens assembly disposed in the barrel;
wherein an angle between a shortest line from an innermost edge to an outermost edge of the specular protrusion region and a normal line to the barrel cylindrical axis is θ, a maximum vertical distance from the specular region to the barrel cylindrical axis is Ymax, a minimum vertical distance from the specular region to the barrel cylindrical axis is Ymin, and the following conditions are satisfied:

10 degrees<θ<45 degrees; and 0.2<(Ymax−Ymin)/Ymax<0.8.

15. An imaging lens assembly, comprising:
a barrel having an incident light surface and a barrel cylindrical axis, wherein the incident light surface comprises a specular region;
a lens assembly disposed in the barrel; and
a substantially planar cover glass located on an incident light side of the barrel;
wherein a surface roughness of the specular g is SR, a minimum distance on the barrel cylindrical axis between the cover glass and the lens assembly is D1, a maximum vertical distance from the specular region to the barrel cylindrical axis is Ymax, a minimum vertical distance from the specular region to the barrel cylindrical axis is Ymin, and the following conditions are satisfied:

SR<1.0 μm;

0 mm<D1<2.0 mm; and 0.2<(Ymax−Ymin)/Ymax<0.8.

16. The imaging lens assembly of claim 15, wherein the surface roughness of the specular region is SR and the following condition is satisfied:

SR<0.35 μm.

17. The imaging lens assembly of claim 16, wherein the surface roughness of the specular region is SR and the following condition is satisfied:

SR<0.15 μm.

18. The imaging lens assembly of claim 16, wherein the specular region comprises at least one specular protrusion region disposed thereon.

19. The imaging lens assembly of claim 18, wherein the specular region comprises at least two specular protrusion regions disposed thereon.

20. The imaging lens assembly of claim 18, wherein the specular protrusion region has a curved surface, a curvature radius of the curved surface is R, and the following condition is satisfied:

0 mm<R<20 mm.

21. The imaging lens assembly of claim 18, wherein an angle between a shortest line from an innermost edge to an outermost edge of the specular protrusion region and a normal line to the barrel cylindrical axis is θ, and the following condition is satisfied:

10 degrees<θ<45 degrees.

22. The imaging lens assembly of claim 21, wherein the angle between the shortest line from the innermost edge to the outermost edge of the specular protrusion region and the normal line to the barrel cylindrical axis is θ, and the following condition is satisfied:

15 degrees<θ<30 degrees.

23. The imaging lens assembly of claim 15, wherein the maximum vertical distance from the specular region to the barrel cylindrical axis is Ymax, the minimum vertical distance from the specular region to the barrel cylindrical axis is Ymin, and the following condition is satisfied:

0.4<(Ymax−Ymin)/Ymax<0.7.

24. The imaging lens assembly of claim 16, wherein the minimum distance on the barrel cylindrical axis between the cover glass and the lens assembly is D1, and the following condition is satisfied:

0 mm<D1<1.3 mm.

25. The imaging lens assembly of claim 24, wherein the minimum distance on the barrel cylindrical axis between the cover glass and the lens assembly is D1, and the following condition is satisfied:

0 mm<$D1$<1.0 mm.

26. A mobile device, comprising:
 an imaging lens assembly, comprising:
  a barrel having an incident light surface and a barrel cylindrical axis, wherein the incident light surface comprises a specular region;
  a lens assembly disposed in the barrel; and
  a substantially planar cover glass located on an incident light side of the barrel;
 wherein a surface roughness of the specular region is SR, a minimum distance on the barrel cylindrical axis between the cover glass and the lens assembly is D1, maximum vertical distance from the specular region to the barrel cylindrical axis is Ymax, a minimum vertical distance from the specular region to the barrel cylindrical axis is Ymin, and the following conditions are satisfied:

SR<1.0 μm;

0 mm<$D1$<2.0 mm; and 0.2<($Y$max−$Y$min)/$Y$max<0.8.

* * * * *